(12) United States Patent
Sugahara et al.

(10) Patent No.: US 10,984,092 B2
(45) Date of Patent: Apr. 20, 2021

(54) INFORMATION PROCESSING DEVICE, NON-TRANSITORY COMPUTER-READABLE RECORDING MEDIUM, AND METHOD FOR DETERMINING AUTHENTICITY OF APPURTENANCE DEVICE

(71) Applicant: MegaChips Corporation, Osaka (JP)

(72) Inventors: Takahiko Sugahara, Osaka (JP); Takeshi Yamamoto, Osaka (JP)

(73) Assignee: MegaChips Corporation, Osaka (JP)

( * ) Notice: Subject to any disclaimer, the term of this patent is extended or adjusted under 35 U.S.C. 154(b) by 344 days.

(21) Appl. No.: 16/217,060

(22) Filed: Dec. 12, 2018

(65) Prior Publication Data

US 2019/0188372 A1    Jun. 20, 2019

(30) Foreign Application Priority Data

Dec. 15, 2017 (JP) .............................. JP2017-240477

(51) Int. Cl.
*G06F 21/44* (2013.01)
*G01R 19/165* (2006.01)
*G06F 1/26* (2006.01)
*G06F 21/73* (2013.01)

(52) U.S. Cl.
CPC ....... *G06F 21/44* (2013.01); *G01R 19/16595* (2013.01); *G06F 1/266* (2013.01); *G06F 21/73* (2013.01); *G06F 2221/2129* (2013.01)

(58) Field of Classification Search
None
See application file for complete search history.

(56) References Cited

U.S. PATENT DOCUMENTS

2015/0046715 A1*  2/2015  Ignatchenko ......... H04L 9/3278
                                                                    713/176
2017/0293337 A1* 10/2017  Ittogi ..................... G06F 1/266

FOREIGN PATENT DOCUMENTS

JP           6068878 B2    1/2017

* cited by examiner

*Primary Examiner* — Joseph P Hirl
*Assistant Examiner* — Hassan Saadoun
(74) *Attorney, Agent, or Firm* — Xsensus LLP

(57) ABSTRACT

The circuitry is configured to determine whether an appurtenance device is an authorized or an unauthorized product, based on a comparison result between a measured current value pattern produced for a predetermined period and a reference current value pattern obtained in advance for the predetermined period.

18 Claims, 19 Drawing Sheets

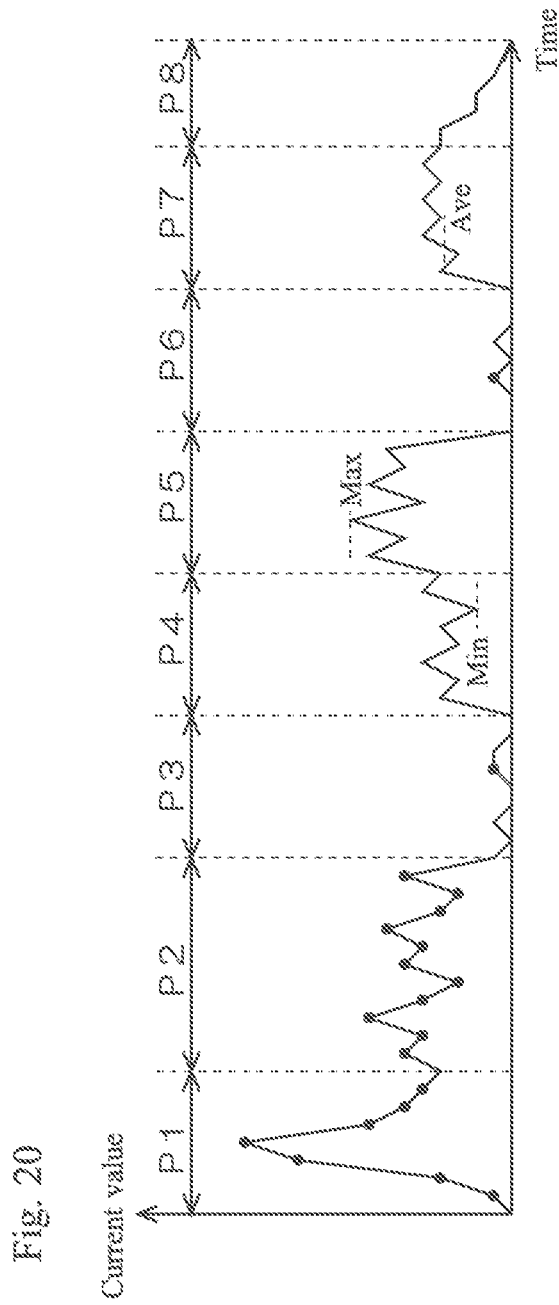

INFORMATION PROCESSING DEVICE, NON-TRANSITORY COMPUTER-READABLE RECORDING MEDIUM, AND METHOD FOR DETERMINING AUTHENTICITY OF APPURTENANCE DEVICE

CROSS REFERENCE TO RELATED APPLICATIONS

The present, application is based on, and claims priority from Japanese Patent Application Serial Number 2017-240477, the disclosure of which is hereby incorporated by reference herein in its entirety.

BACKGROUND

Technical Field

The present disclosure relates to an information processing device, a non transitory computer-readable recording medium, and a method for determining the authenticity of an appurtenance device.

Related Art

JP6068878B describes a memory system including an information processing device and a memory device connected thereto. The memory system measures a current consumption between the information processing device and the memory device, calculates a rate of change in the current consumption from the amount of change in the current consumption per unit time, and compares a pattern of the rate of the change in the current consumption produced for the memory device and that for an authorized product, to determine whether or not the memory device is an authorized product.

SUMMARY

An information processing device to which an appurtenance device is to be connected includes circuitry configured to supply power to the appurtenance device, obtain a plurality of measured current values from the information processing device to the appurtenance device measured at a plurality of measurement points, chronologically arrange the obtained measured current values to produce a measured current value pattern, compare the produced measured current value pattern with a reference current value pattern of an authorized or an unauthorized product obtained in advance, and determine whether the appurtenance device is an authorized or an unauthorized product, based on a comparison result between a first measured current value pattern produced for a first predetermined period among a plurality of predetermined periods obtained by dividing an operational period of the appurtenance device and a first reference current value pattern that is obtained in advance for the first predetermined period.

A non-transitory computer-readable recording medium has a program recorded thereon configured to cause an on-board computer of an information processing device to which an appurtenance device is to be connected, the information processing device including circuitry to supply power to the appurtenance device and measure a current from the information processing device to the appurtenance device, to perform determination of whether the appurtenance device is an authorized or an unauthorized product. The determination includes obtaining a plurality of measured current values measured at a plurality of measurement points, chronologically arranging the obtained measured current values to produce a measured current value pattern, comparing the produced measured current value pattern with a reference current value of an authorized or an unauthorized product that is obtained in advance, and determining whether the appurtenance device is an authorized or an unauthorized product based on a comparison result between a first measured current value pattern produced for a first predetermined period among a plurality of predetermined periods obtained by dividing an operational period of the appurtenance device and a first reference current value pattern obtained in advance for the first predetermined period.

A method for determining authenticity of an appurtenance device to be connected to an information processing device includes supplying power to the appurtenance device, obtaining a plurality of measured current values from the information processing device to the appurtenance device measured at a plurality of measurement points, producing a measured current value pattern by chronologically arranging the obtained measured current values, comparing the produced measured current value pattern with a reference current value pattern of an authorized or an unauthorized product that is obtained in advance, and determining whether the appurtenance device is an authorized or an unauthorized product based on a comparison result between a first measured current value pattern produced for a first predetermined period among a plurality of predetermined periods obtained by dividing an operational period of the appurtenance device and a first reference current value pattern obtained in advance for the first predetermined period.

BRIEF DESCRIPTION OF THE DRAWINGS

FIG. 20 is a diagram illustrating an example of the current consumption characteristics of the memory device.

DETAILED DESCRIPTION

Figure 1:
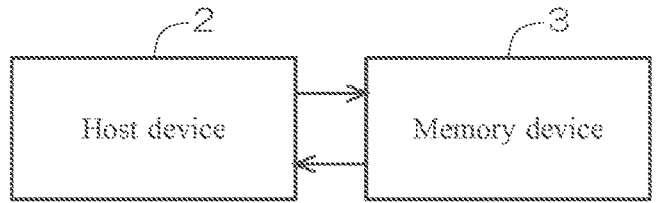
FIG. 1 is a diagram illustrating a configuration of a memory system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing. The term "circuitry" herein may be partly or entirely implemented by using either hardware or software, or both hardware and software.

The memory system described in JP6068878B may possibly determine erroneously that a memory device connected to the information processing device, which is an inferior unauthorized product having a far greater absolute value of current consumption than an authorized product, is an authorized product, if the pattern of rates of change in current consumption of the memory device accidentally matches that of an authorized product at a measurement point of current consumption.

The present disclosure is directed to an information processing device, a non-transitory computer-readable recording medium, and a method for determining the authenticity of an appurtenance device, for achieving highly accurate authenticity determination of whether a connected appurtenance device is an authorized or an unauthorized product, even where authorized and unauthorized products have a similar pattern of rates of change in current consumption.

An information processing device to which an appurtenance device is to be connected according to an aspect of the present disclosure includes a power supply unit configured to supply power to the appurtenance device, a current measurement unit configured to measure a current from the power supply unit to the appurtenance device, and a determination unit configured to determine whether the appurtenance device is an authorized or an unauthorized product. The determination unit includes a current value obtaining unit configured to obtain a plurality of measured current values measured by the current measurement unit at a plurality of measurement points from the current measurement unit, a pattern producing unit configured to chronologically arrange the measured current values obtained by the current value obtaining unit to produce a measured current value pattern and a pattern comparing unit configured to compare the measured current value pattern produced by the pattern producing unit with a reference current value pattern of an authorized or an unauthorized product that is obtained in advance. The determination unit is configured to determine whether the appurtenance device is an authorized or an unauthorized product, based on a comparison result by the pattern comparing unit between a first measured current value pattern produced by the pattern producing unit for a first predetermined period among a plurality of predetermined periods obtained by dividing an operational period of the appurtenance device and a first reference current value pattern obtained in advance for the first predetermined period. The power supply unit, the current measurement unit, the determination unit, the current value obtaining unit, the pattern producing unit, and the pattern comparing unit may comprise suitable logic, circuitry, interfaces, and/or code.

In the information processing device according to this aspect, the determination unit determines whether the appurtenance device is an authorized or an unauthorized product, based on a comparison result by the pattern comparing unit between the first measured current value pattern produced by the pattern producing unit for the first predetermined period and the first reference current value pattern obtained in advance for the first predetermined period. Since unauthorized products tend to be inferior, absolute values of current consumption of unauthorized products are often larger than those of authorized products. In the information processing device according to this aspect, the determination unit compares the measured current value pattern, rather than a pattern of rates of change in current consumption, with the reference current value pattern. This achieves highly accurate authenticity determination of whether the appurtenance device connected to the information processing device is an authorized or an unauthorized product even when authorized and unauthorized products have a similar pattern of rates of change in current consumption.

In some embodiments of the information processing device, the pattern comparing unit is configured compare measured current values composing the measured current value pattern with reference current values composing the reference current value pattern respectively, and the determination unit is configured to determine whether the appurtenance device is an authorized or an unauthorized product, depending on whether all measured current values in the first predetermined period match corresponding reference current values.

According to such embodiments, the determination unit determines whether the appurtenance device is an authorized or an unauthorized product, depending on whether all measured current values in the first predetermined period match corresponding reference current values. Thus for example, when an unauthorized product has a measured current value pattern that is different in part from that of an authorized product, such unauthorized product is eliminated with high accuracy.

In some embodiments of the information processing device, the pattern comparing unit is configured to compare measured current values composing the measured current value pattern with reference current values composing the reference current value pattern respectively, and the determination unit is configured to determine whether the appurtenance device is an authorized or an unauthorized product, depending on whether a proportion of measured current values that match corresponding reference current values of all measured current values in the first predetermined period is larger than or equal to a first threshold.

According to such embodiments, the determination unit determines whether the appurtenance device is an authorized or an unauthorized product, depending on whether the proportion of the measured current values that match the corresponding reference current values of all measured current values in the first predetermined period is larger than or equal to the first threshold. This effectively prevents an authorized product from being erroneously determined to be an unauthorized product, even when, for example, the measured current values of the authorized product instantaneously increase or decrease due to unexpected noise or the like.

In some embodiments of the information processing device, the determination unit is configured to perform obtainment of the measured current values by the current value obtaining unit, production of the measured current value pattern by the pattern producing unit, and comparison between the measured current value pattern and the reference current value pattern by the pattern comparing unit for N times, where N is a plural number, and determine whether the appurtenance device is an authorized or an unauthorized product depending on whether a proportion of results that the measured current value pattern matches the reference current value pattern of N-time comparison by the pattern comparing unit is larger than or equal to a second threshold.

According to such embodiments, the determination unit performs obtainment of measured current values by the current value obtaining unit, production of the measured current value pattern by the pattern producing unit, and comparison between the measured current value pattern and the reference current value pattern by the pattern comparing unit for multiple N times, and determine whether the appurtenance device is an authorized or an unauthorized product depending on whether the proportion of results that the measured current value pattern matches the reference current value pattern of N-time comparison by the pattern comparing unit is larger than or equal to the second threshold. Repeating, a series of processes by the current value obtaining unit, the pattern producing unit and the pattern comparing unit for multiple N times, and performing authenticity determination of the appurtenance device based on the results of N-time comparison by the pattern comparing unit, improves determination accuracy.

In some embodiments of the information processing device, the determination unit is configured to determine whether the appurtenance device is an authorized or an unauthorized product, further based on a comparison result by the pattern comparing unit between a second measured current value pattern produced by the pattern producing unit for a second predetermined period among the plurality of predetermined periods and a second reference current value pattern obtained in advance for the second predetermined period.

According to such embodiments, the determination unit determines whether the appurtenance device is an authorized or an unauthorized product, further based on a comparison result by the pattern comparing unit between the second measured current value pattern produced by the pattern producing unit for the second predetermined period among the plurality of predetermined periods and the second reference current value pattern obtained in advance for the second predetermined period. By comparing the measured current value pattern with the reference current value pattern for the second predetermined period as well as for the first predetermined period, authenticity determination of the appurtenance device is performed based on both of the comparison results for the first predetermined period and for the second predetermined period which further improves determination accuracy.

In some embodiments of the information processing device, the determination unit includes a representative value calculation unit configured to calculate a predetermined measured representative value based on the measured current values obtained by the current value obtaining unit, and a representative value comparing unit configured to compare the measured representative value calculated by the representative value calculation unit with a reference representative value of an authorized or an unauthorized product that is obtained in advance. The determination unit is configured to determine whether the appurtenance device is an authorized or an unauthorized product, further based on a comparison result by the representative value comparing unit between a first measured representative value calculated by the representative value calculation unit for the first predetermined period and a first reference representative value obtained in advance for the first predetermined period. The representative value calculation unit and the representative value comparing unit may comprise suitable logic, circuitry, interfaces, and/or code.

According to such embodiments, the determination unit determines whether the appurtenance device is an authorized or an unauthorized product, further based on a comparison result by the representative value comparing unit between the first measured representative value calculated by the representative value calculation unit for the first predetermined period and first reference representative value obtained in advance for the first predetermined period. Authenticity determination of the appurtenance device is performed based on both of the comparison results between the measured representative value and the reference representative value as well as between the measured current value pattern and the reference current value pattern, which further improves determination accuracy.

In some embodiments of the information processing device, the determination unit is further includes a representative value calculation unit configured to calculate a predetermined measured representative value based on the measured current values obtained by the current value obtaining unit, and a representative value comparing unit configured to compare the measured representative value calculated by the representative value calculation unit with a reference representative value of an authorized or an unauthorized product obtained in advance. The determination unit is configured to determine whether the appurtenance device is an authorized or an unauthorized product, further based on a comparison result by the representative value comparing unit between a second measured representative value calculated by the representative value calculation unit for a second predetermined period among the plurality of predetermined periods and a second reference representative value obtained in advance for the second predetermined period. The representative value calculation unit and the representative value comparing unit may comprise suitable logic, circuitry; interfaces, and/or code.

According to such embodiments, the determination unit determines whether the appurtenance device is an authorized or an unauthorized product, further based on a comparison result by the representative value comparing unit between the second measured representative value calculated by the representative value calculation unit for the second predetermined period and the second reference representative value obtained in advance for the second predetermined period. Authenticity determination of the appurtenance device is performed based on both of the comparison results between the measured representative value and the reference representative value for the second predetermined period as well as between the measured current value pattern and the reference current value pattern for the first predetermined period, which further improves determination accuracy. Employing different processes of determination between the first and the second predetermined periods effectively makes analysis of determination algorithms by a third party more difficult.

In some embodiments of the information processing device, the representative value calculation unit is configured to calculate at least one of an average, a maximum, and a minimum values as the measured representative value.

According to such embodiments, the representative value calculation unit calculates at least one of the average, the maximum, and the minimum values as the measured representative value. Employing at least one of the average, the maximum, and the minimum values as the measured representative value facilitates calculation of the measured representative value.

In some embodiments of the information processing device, the representative value calculation unit is configured to calculate a first value selected from the average, the maximum, and the minimum values for one of two successive second predetermined periods, and calculate a second value different from the first value for the other second predetermined period.

According to such embodiments, the representative value calculation unit calculates the first value selected from the average, the maximum, and the minimum values for one of two successive second predetermined periods, and calculates the second value different from the first value for the other second predetermined period. Employing different processes of determination in two successive second predetermined periods effectively makes analysis of determination algorithms by a third party more difficult.

In some embodiments of the information processing device, the determination unit further includes a current value selecting unit configured to select an arbitrary measured current value from the measured current values obtained by the current value obtaining unit, and a current value comparing unit configured to compare the measured current value selected by the current value selecting unit with a reference current value of an authorized or an unauthorized product- that is obtained in advance. The determination unit is configured to determine whether the appurtenance device is an authorized or an unauthorized product, further based on a comparison result by the current value comparing unit between the measured current value selected by the current value selecting unit for a third predetermined period among the plurality of predetermined periods and a reference current value obtained in advance for the third predetermined period. The current value selecting unit and the current value comparing unit may comprise suitable logic, circuitry, interfaces, and/or code.

According to such embodiments, the determination unit determines whether the appurtenance device is an authorized or an unauthorized product, further based on a comparison result by the current value comparing unit between the measured current value selected by the current value selecting unit for the third predetermined period and the reference current value obtained in advance for the third predetermined period. Authenticity determination of the appurtenance device is performed based on both of the comparison results between the measured current value and the reference current value for e third predetermined period as well as between the measured current value pattern and the reference current value pattern for the first predetermined period, which further improves determination accuracy. Employing different processes of determination between the first predetermined period and the third predetermined period effectively makes analysis of determination algorithms by a third party more difficult.

In some embodiments of the information processing device, the determination unit further includes a period setting unit configured to variably select the first predetermined period from the plurality of predetermined periods. The period setting unit may comprise suitable logic, circuitry, interfaces, and/or code.

According to such embodiments, the period setting unit variably selects the first predetermined period from the plurality of predetermined periods. Altering the first predetermined period, which is a target period for authenticity determination of the appurtenance device, statically or dynamically by the period setting unit effectively makes analysis of determination algorithms by a third party more difficult.

In some embodiments of the information processing device, the determination unit further includes a period setting unit configured to variably select the second predetermined period from the plurality of predetermined periods. The period setting unit may comprise suitable logic, circuitry, interfaces,, and/or code.

According to such embodiments, the period setting unit variably selects the second predetermined period from the plurality of predetermined periods. Altering the second predetermined period, which is a target period for authenticity determination of the appurtenance device, statically or dynamically by the period setting unit effectively makes analysis of determination algorithms by a third party more difficult.

In some embodiments of the information processing device, the determination unit further includes a period setting unit configured to variably select the third predetermined period from the plurality of predetermined periods. The period setting unit may comprise suitable logic, circuitry, interfaces, and/or code.

According to such embodiments, the period setting unit variably selects the third predetermined period from the plurality of predetermined periods. Altering the third predetermined period, which is a target period for authenticity determination of the appurtenance device, statically or dynamically by the period setting unit effectively makes analysis of determination algorithms by a third party more difficult.

In some embodiments of the information processing device, the reference current value pattern is stored in a storage of the appurtenance device. The determination unit is configured to read the reference current value pattern from the storage.

According to such embodiments, the reference current value pattern is stored in a storage of the appurtenance device. Different appurtenance devices have different reference current value patterns, depending on the structure, the manufacturing process, and the like of the devices. Thus storing a reference current value pattern obtained for a certain appurtenance device in the storage of this appurtenance device facilitates management of the reference current value pattern that differs from device to device.

In some embodiments of the information processing device, the reference representative value is stored in a storage of the appurtenance device. The determination unit is configured to read the reference representative value from the storage.

According to such embodiments, the reference representative value is stored in a storage of the appurtenance device. Different appurtenance devices have different reference representative values, depending on the structure, the manufacturing process, and the like of the devices. Thus storing a reference representative value obtained for a certain appurtenance device in the storage of this appurtenance device facilitates management of the reference representative value that differs from device to device.

In some embodiments of the information processing device, the reference current value is stored in a storage of the appurtenance device. The determination unit is configured to read the reference current value from the storage.

According to such embodiments, the reference current value is stored in a storage of the appurtenance device. Different appurtenance devices have different reference current values, depending on the structure, the manufacturing process, and the like of the devices. Thus storing a reference current value obtained for a certain appurtenance device in the storage of this appurtenance device facilitates management of the reference current value that differs from device to device.

A non-transitory computer-readable recording medium according to an aspect of the present disclosure has a program recorded thereon configured to cause an on-board computer of an information processing device to which an appurtenance device is to be connected, the information processing device including a power supply unit configured to supply power to the appurtenance device and a current measurement unit configured to measure a current from the power supply unit to the appurtenance device, to function as determination means that determines whether the appurtenance device is an authorized or an unauthorized product. The determination means includes current value obtaining means that obtains a plurality of measured current values measured by the current measurement unit at a plurality of measurement points from the current measurement unit, pattern producing means that chronologically arranges the measured current values obtained by the current value obtaining means to produce a measured current value pattern, and pattern comparing means that compares the measured current value pattern produced by the pattern producing means with a reference current value pattern of an authorized or an unauthorized product that is obtained in advance. The determination means determines whether the appurtenance device is an authorized or an unauthorized product, based on a comparison result by the pattern comparing means between a first measured current value pattern produced by the pattern producing means for a first predetermined period among a plurality of predetermined periods obtained by dividing an operational period of the appurtenance device and a first reference current value pattern obtained in advance for the first predetermined period. The power supply unit, the current measurement unit, determination means, the current value obtaining means, the pattern producing means, and the pattern comparing means may comprise suitable logic, circuitry, interfaces, and/or code.

In the program according to this aspect, the determination means determines whether the appurtenance device is an authorized or an unauthorized product, based on a comparison result by the pattern comparing means between the first measured current value pattern produced by the pattern producing means for the first predetermined period and the first reference current value pattern obtained in advance for the first predetermined period. Since unauthorized products tend to be inferior, absolute values of current consumption of unauthorized products are often larger than those of authorized products. In the program according to this aspect, the determination means compares the measured current value pattern, rather than a pattern of rates of change in current consumption, with the reference current value pattern. This achieves highly accurate authenticity determination of whether the appurtenance device connected to the information processing device is an authorized or unauthorized product even when authorized and unauthorized products have a similar pattern of rates of change in current consumption.

A method for determining an authenticity of an appurtenance device to be connected to an information processing device according to an aspect of the present disclosure is a method for determining the authenticity of the appurtenance device, of determining whether the appurtenance device is an authorized or an unauthorized product, the information processing device including a power supply unit configured to supply power to the appurtenance device and a current measurement unit configured to measure a current from the power supply unit to the appurtenance device. The method includes obtaining a plurality of measured current values measured by the current measurement unit at a plurality of measurement points from the current measurement unit, producing a measured current value pattern by chronologically arranging the obtained measured current values, comparing the produced measured current value pattern with a reference current value pattern of an authorized or an unauthorized product that is obtained in advance, and determining whether the appurtenance device is an authorized or an unauthorized product, based on a comparison result: between a first measured current value pattern produced for a first predetermined period among a plurality of predetermined periods obtained by dividing an operational period of the appurtenance device and a first reference current value pattern obtained in advance for the first predetermined period. The power supply unit and the current measurement unit may comprise suitable logic, circuitry, interfaces, and/or code.

In the method for determining the authenticity of an appurtenance device according to this aspect, whether the appurtenance device is an authorized or an unauthorized product is determined based on a comparison result between the first measured current value pattern produced for the first predetermined period and the first reference current value pattern obtained in advance for the first predetermined period. Since unauthorized products tend to be inferior, absolute values of current consumption of unauthorized products are often larger than those of authorized products. In the method for determining the authenticity of an appurtenance device according to this aspect, comparison is performed between the measured current value pattern, rather than a pattern of rates of change in current consumption, and the reference current value pattern. This achieves highly accurate authenticity determination of whether the appurtenance device connected to the information processing device is an authorized or an unauthorized product even when authorized and unauthorized products have a similar pattern of rates of change in current consumption.

Embodiments of the present disclosure achieves highly accurate authenticity determination of whether the connected appurtenance device is an authorized or an unauthorized product, even when authorized and unauthorized products have a similar pattern of rates of change in current consumption.

These and other objects, features, aspects and advantages of the present disclosure will become more apparent from the following description of embodiments when taken in conjunction with the accompanying drawings.

DESCRIPTION OF EMBODIMENTS

Embodiments of the present disclosure are described in detail below referring to the drawings. It should be noted that identical reference numerals throughout the drawings indicate identical or equivalent elements.

FIG. 1 is a diagram illustrating a configuration of a memory system 1 according to an embodiment of the present disclosure. As illustrated in FIG. 1, the memory system 1 includes a host device 2, and a memory device 3 detachably connected to the host device 2. The host device 2 is an information processing device such as a personal computer, while the memory device 3 is an appurtenance device, such as a flash memory card, operable with power supplied by the host device 2. In another example, the information processing device may be a printer or a multi-functional device, while the appurtenance device may be a toner cartridge. Alternatively, the information processing device may be a gaming console, while the appurtenance device pray be a memory card in which a gaming program is stored.

Figure 2:
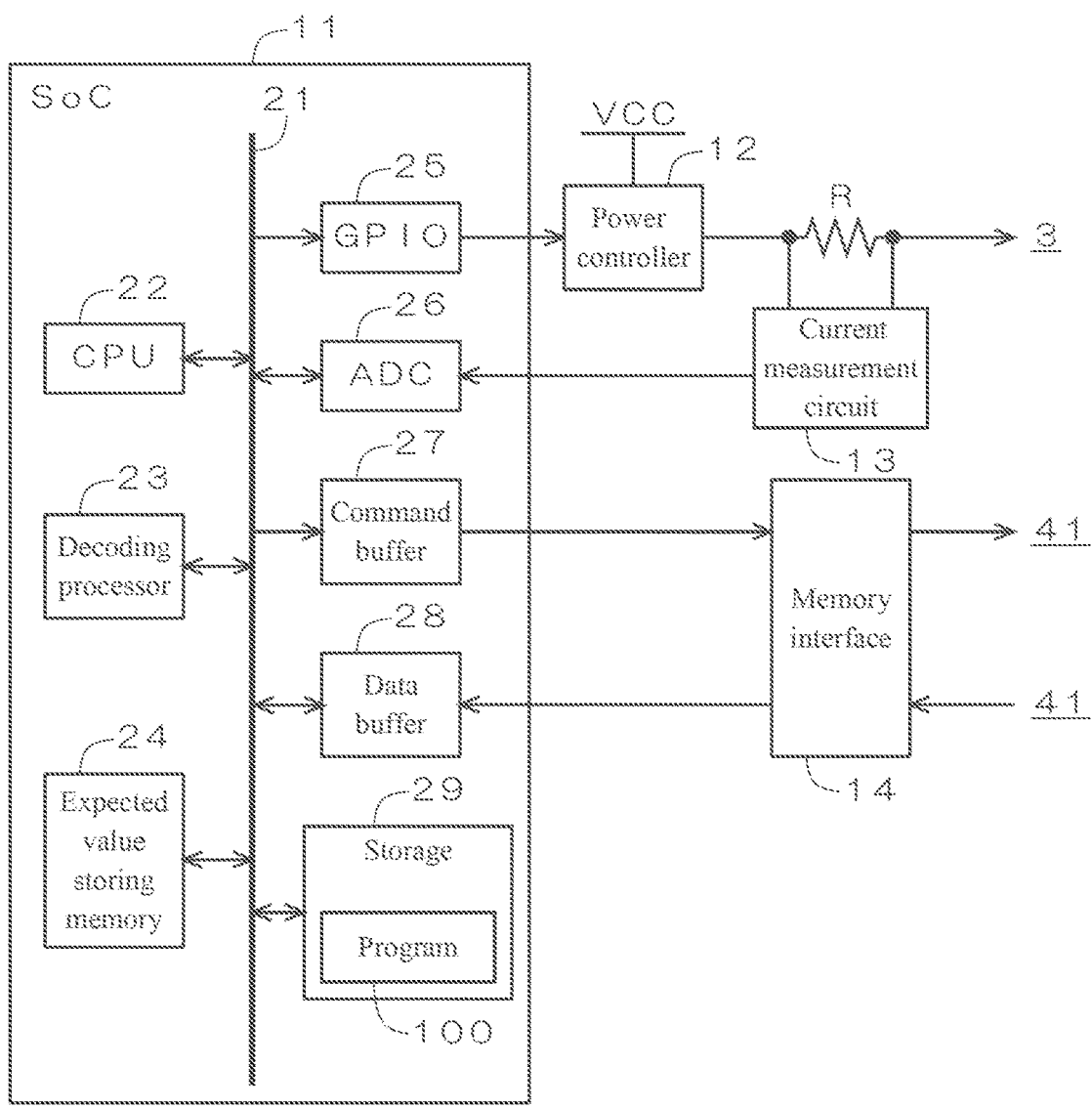
FIG. 2 is a simplified diagram illustrating a configuration of a host device.

FIG. 2 is a simplified diagram illustrating a configuration of the host device 2. As illustrated in FIG. 2, the host device 2 includes a System on a Chip (SoC) 11, a power controller 12, a current measurement circuit 13, and a memory interface 14. The SoC 11 includes a CPU 22, a decoding processor 23, an expected value storing memory 24, a General Purpose Input/Output (GPIO) 25, an Analog to Digital Converter (ADC) 26, a command buffer 27, a data buffer 28, and a storage 29 such as ROM or RAM, connected to each other via a bus 21. The storage 29 retains a program 100. The host device 2 supplies the memory device 3 connected thereto with power to operate the memory device 3 from a power VCC (power supply unit) via the power controller 12 and a resistance element R. The current measurement circuit 13 measures a voltage between both ends of the resistance element R to measure the value of a current passing from the power VCC to the memory device 3.

Figure 3:
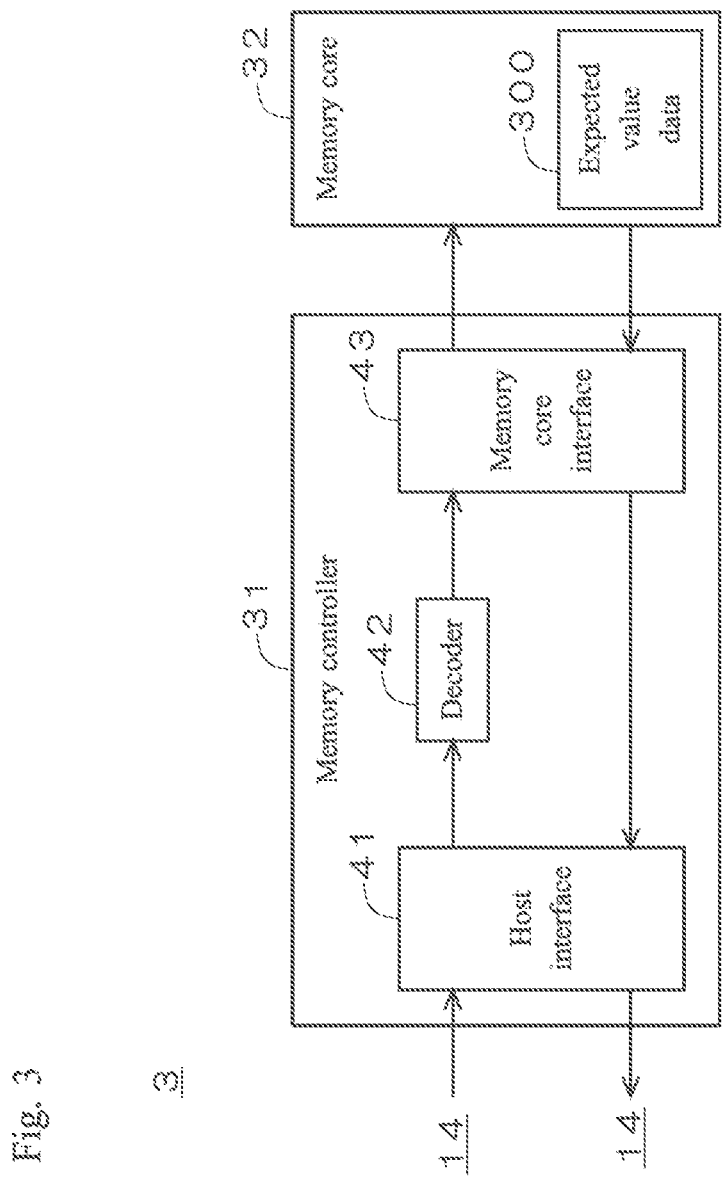
FIG. 3 is a simplified diagram illustrating a configuration of a memory device.

FIG. 3 is a simplified diagram illustrating a configuration of the memory device 3. As illustrated in FIG. 3, the memory device 3 includes a memory controller 31 and a memory core 32. The memory controller 31 includes a host interface 41, a decoder 42, and a memory core interface 43. The memory core 32 at its specific address area retains below-described expected value data 300.

Figure 4:
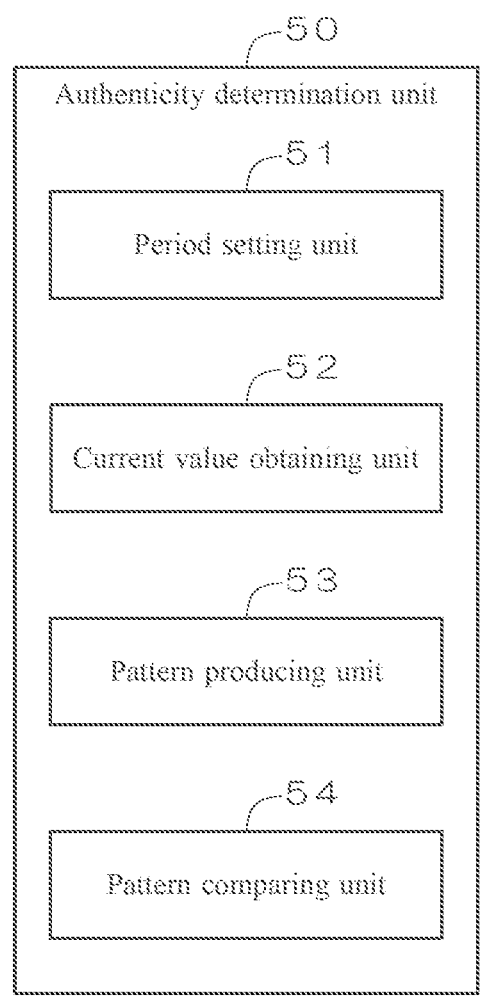
FIG. 4 is a diagram illustrating functions performed by executing a program by a CPU.

FIG. 4 is a diagram illustrating functions performed by executing the program 100 illustrated in FIG. 2 by the CPU 22. As illustrated in FIG. 2, the CPU 22 executes the program 100 read from the storage 29, to serve as an authenticity determination unit 50 that determines whether the memory device 3 connected to the host device 2 is an authorized or an unauthorized product. In other words, the program 100 causes a computer in the host device 2 being an information processing device to serve as the authenticity determination unit 50. As illustrated in FIG. 4, the authenticity determination unit 50 serves as a period setting unit 51, a current value obtaining unit 52, a pattern producing unit 53, and a pattern comparing unit 54.

Authorized memory devices 3 (genuine products) noticeably differ from unauthorized products (counterfeit products) in current consumption characteristics, due to differences in the structure, the manufacturing process, and the like of semiconductor devices. The host device 2 according to the present embodiment measures the values of current consumption (absolute value) of the memory device 3 to produce a measured current value pattern, and compares the measured current value pattern with a known reference current value pattern of an authorized or unauthorized product to perform authenticity determination of whether the memory device 3 connected to the host device 2 is an authorized or an unauthorized product. More detailed description is given below with reference to drawings.

Figure 5:
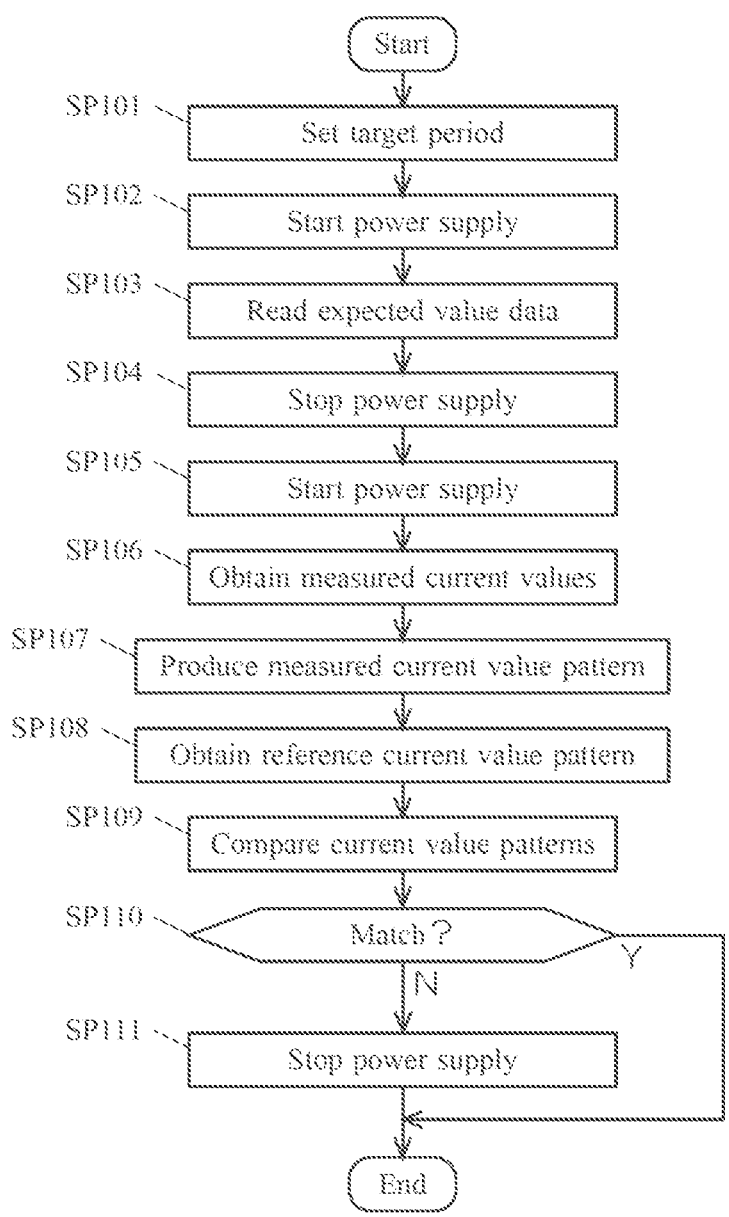
FIG. 5 is a flow chart for illustrating the operation of the host device.
Figure 6:
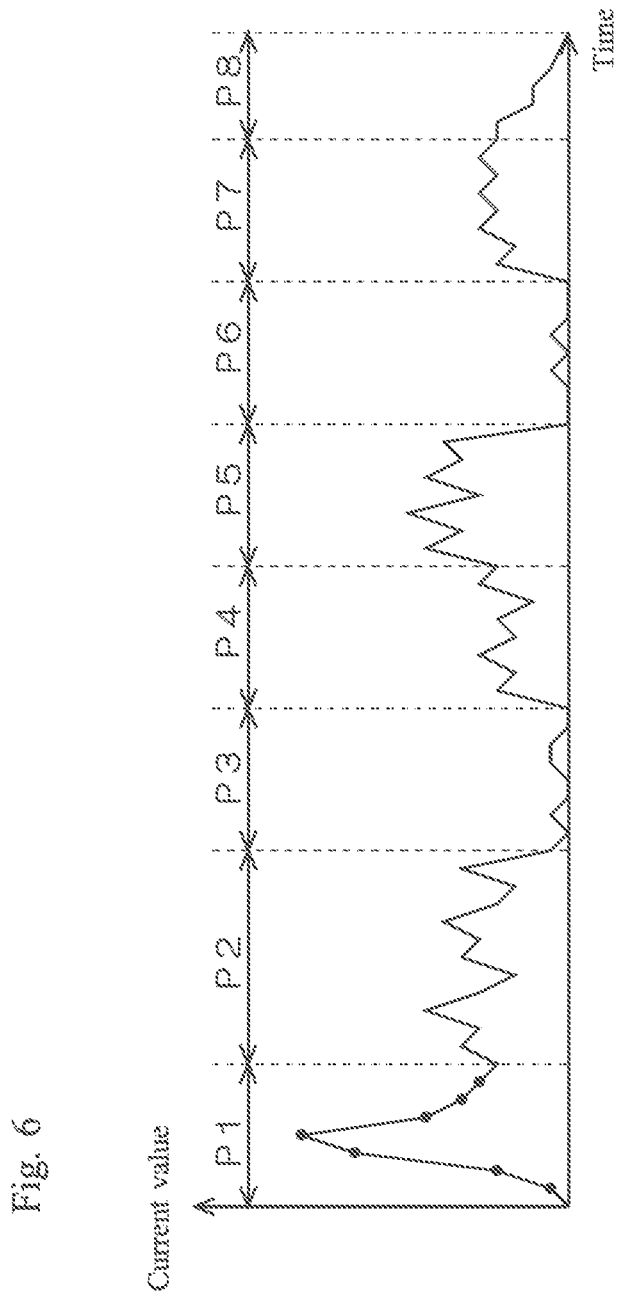
FIG. 6 is a diagram illustrating an example of the current consumption characteristics of the memory device.

FIG. 5 is a flow chart for illustrating the operation of the host device 2. FIG. 6 is a diagram illustrating an example of the current consumption characteristics of the memory device 3. As illustrated in FIG. 6, the normal operational period of the memory device 3 can be divided into multiple periods P depending on processes. In the example illustrated in FIG. 6, the normal operational period is divided into eight periods P1 to P8 laid in this order. For example, the period P1 is a power-on period soon after startup, the period P2 is an initialization period for initializing various settings, the periods P3 and P6 are standby periods, the period P4 is a key-exchange period for mutual authentication, the period P5 is an authentication period in which mutual authentication is performed with exchanged keys, the period P7 is an application-executing period, and the period P8 is a power-off period for shutdown. Other examples of the periods P include a command input period, a memory core access period, a data read period, a data write period, a data delete period, a data communication period, and the like.

Authorized memory devices 3, for which the types of semiconductor devices to be implemented and the manufacturing processes of each device are strictly controlled, would show almost consistent current consumption characteristics in each of the periods P1 to P8. Thus information on the current consumption characteristics in each of the periods P1 to P8 is produced before factory shipments, and stored as encoded expected value data 300 in the specific address area of the memory core 32 (see FIG. 3). In the example according to the present embodiment, the memory core 32 retains the following information as the expected value data 300 in each of the periods P1 to P8:

a transitional pattern of the values of current consumption obtained by sampling the values of current consumption at a predetermined sampling frequency (reference current value pattern)

the maximum, the minimum, and the average values of current consumption (reference representative value)

a value of minute current consumption in a standby period (reference current value).

When an unauthorized product to be eliminated is already identified, the reference current value pattern, the reference representative value, or the reference current value of the unauthorized product may be stored in the memory core 32, instead of the reference current value pattern, the reference representative value, or the reference current value of an authorized product. For example, when the reference current value pattern of an authorized product is employed, whether the memory device 3 is an authorized product or not can be determined depending on whether a measured current value pattern (described in detail below) matches the reference current value pattern. When the reference current value pattern of an unauthorized product is employed, whether the memory device 3 is an unauthorized product or not can be determined depending on whether a measured current value pattern matches the reference current value pattern. The same applies to the reference representative value and the reference current value. In the present embodiment and below-described modifications, description is given of an example of employing the reference current value pattern, the reference representative value or the reference current value of an authorized product.

Preferable expected value data 300 in each of the periods P1 to P8 is the reference current value pattern, the reference representative value, or the reference current value, depending on the current consumption characteristics or the like in each period. The example is as follows.

In the power-on period, the values of current consumption and the amount of change thereof are large, and the way the current consumption changes is distinctive depending on a device. Therefore the reference current value pattern is preferable for the period P1.

In the initialization period, the values of current consumption and the amount of change thereof are relatively large. Therefore for the period P2, the reference current value pattern is preferable when the determination accuracy has priority, while the reference representative value is preferable when reducing the load of determination has priority.

In the standby period, the values of current consumption and the amount of change thereof are relatively small. Therefore for the periods P3 and P6, the reference current value is preferable.

In the key-exchange period and the authentication period, the values of current consumption and the amount of change thereof are relatively large, and an implementation logic or an operational logic may be easily identified by the maximum, the minimum, or the average value of current consumption. Therefore for the periods P4 and P5, the reference current value pattern is preferable when determination accuracy has priority, while the reference representative value is preferable when reducing the load of determination has priority.

In the application-executing period, the values of current consumption and the amount of change thereof are relatively large, and the way the current consumption changes varies every instant depending on operations. Therefore the reference representative value is preferable for the period P7.

In the power-off period, there is a current slope toward a current value 0, and the amount of change of the current consumption is relatively large. Therefore for the period P8, the reference current value pattern is preferable Then determination accuracy has priority, while the reference representative value (except the minimum value) is preferable when reducing the load of determination has priority.

Referring to FIG. 5, when the memory device 3 is connected to the host device 2, in Step SP101, the CPU 22 (period setting unit 51) sets at least one target period (hereinafter, "first predetermined period") on which authenticity determination is to be performed from the periods P1 to P8. The period setting unit 51 can statically alter the first predetermined period in accordance with a preset rule, or dynamically alter the first predetermined period depending on, for example, cumulative number of times authenticity determination is performed, or the operating status of the memory system 1. In the example according to the present embodiment, the period P1, which is the power-on period, is assumed to be the first predetermined period. The period setting unit 51 also sets a process of authenticity determination to be performed in the first predetermined period. In the example according to the present embodiment, "comparison between current value patterns" is set as the process of authenticity determination. This setting may be omitted when comparison between current value patterns is performed by default.

In Step SP102, the CPU 22 sets the GPIO 25 with a control command to cause the power controller 12 to start power supply. The control command is input from the GPIO 25 to the power controller 12, and the power controller 12 starts power supply from the power VCC to the memory device 3.

In Step SP103, the CPU 22 sets the command buffer 27 with a read command to read a desired expected value data 300 from the memory device 3. The read command is sent from the command buffer 27 via the memory interface 14 to the memory device 3. The host interface 41 inputs the read command received from the host device 2 to the decoder 42. The decoder 42 decodes the inputted read command and inputs the read address of the desired expected value data 300 to the memory core interface 43. The read address is input from the memory core interface 43 to the memory core 32, and thereby the desired expected value data 300 is read from the memory core 32. In the example according to the present embodiment, since the process of authenticity determination is set to "comparison between current value patterns in the period P1," the reference current value pattern in the period P1 and data on a corresponding predetermined tolerance are read as the desired expected value data 300 from the memory core 32. The tolerance has an optimal value within a range of plus or minus several to ten-odd percent, set in advance depending on, for example, the way current values are distributed in the reference current value pattern in the period P1. The read expected value data 300 is sent as encoded via the memory core interface 43 and the host interface 41 to the host device 2. The memory interface 14 inputs the expected value data 300 received from the memory device 3 to the decoding processor 23 via the data buffer 28. The decoding processor 23 decodes the encoded expected value data 300. The decoded expected value data 300 is stored in the expected value storing memory 24. In the example according to the present embodiment, the reference current value pattern in the period P1 and the data on the corresponding predetermined tolerance are stored in the expected value storing memory 24.

Since the period P1, which is the power-on period, is set as the first predetermined period, in Step SP104, the CPU 22 sets the GPIO 25 with a control command to cause the power controller 12 to stop power supply. The control command is input from the GPIO 25 to the power controller 12, and the power controller 12 stops power supply from the power VCC to the memory device 3.

In Step SP105, the CPU 22 sets the GPIO 25 with a control command to cause the power controller 12 to start power supply. The control command is input from the GPIO 25 to the power controller 12, and the power controller 12 starts power supply from the power VCC to the memory device 3. This starts the period P1, which is the power-on period.

In Step SP106, the CPU 22 drives the ADC 26. As the power supply from power VCC to the memory device 3 is started, a current is fed through the resistance element R. The current measurement circuit 13 samples the voltage between both ends of the resistance element R at a predetermined sampling frequency (for example, one to several megahertz), to measure the values of the current passing from the power VCC to the memory device 3. The measured current values are amplified by a preamplifier not illustrated in the figure, A/D converted by the ADC 26, and then sequentially input to the CPU 22 by the current value obtaining unit 52. Instead of amplifying the measured current values by the preamplifier before A/D conversion by the ADC 26, the measured current values may be A/D converted by the ADC 26 and then amplified by a multiplier.

In Step SP107, the CPU 22 (pattern producing unit 53) chronologically arranges the multiple measured current values sequentially obtained by the current value obtaining unit 52, to produce a measured current value pattern in the period P1 of the memo device 3.

In Step SP108, the CPU 22 (pattern comparing unit 54) reads to obtain the reference current value pattern and the data on the tolerance from the expected value storing memory 24.

In Step SP109, the CPU 22 (pattern comparing unit 54) compares the measured current value pattern produced by the pattern producing unit 53 with the reference current value pattern read from the expected value storing memory 24.

Figure 7:
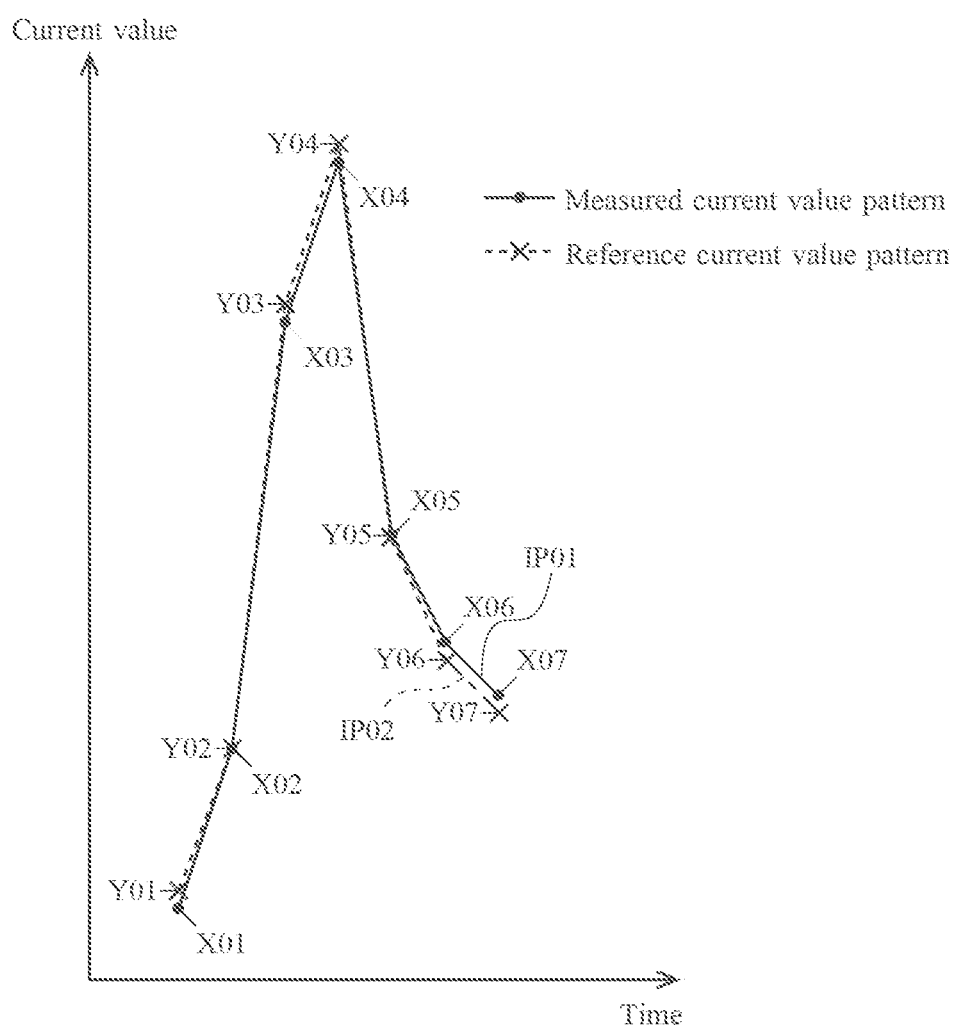
FIG. 7 is a diagram illustrating an example of a measured current value pattern and a reference current value pattern.

FIG. 7 is a diagram illustrating an example of the measured current value pattern and the reference current value pattern. When the sampling frequency of the current measurement circuit 13 is one to several megahertz and the length of the period P1 is several to several dozen milliseconds, the measured current value pattern and the reference current value pattern actually include several hundred thousand to several million measured current values and reference current values, respectively. FIG. 7 illustrates, in order to facilitate the description, the measured current value pattern IP01 and the reference current value pattern IP02 including seven measured current values X01 to X07 and reference current values Y01 to Y07, respectively. The pattern comparing unit 54 compares the corresponding measured current values X01 to X07 and reference current values Y01 to Y07 to determine whether each difference is smaller than or equal to the tolerance read from the expected value storing memory 24.

In Step SP110, the CPU 22 (authenticity determination unit 50) determines whether all of the differences between the measured current values X01 to X07 and the reference current values Y01 to Y07 are smaller than or equal to the tolerance. When all of these differences are smaller than or equal to the tolerance (i.e., a perfect match), the authenticity determination unit 50 determines that the memory device 3 connected to the host device 2 is an authorized product, and terminates the authenticity determination. In the example illustrated in FIG. 7, the measured current values X01 to X07 perfectly match the reference current values Y01 to Y07, and thus the memory device 3 is determined to be an authorized product.

In contrast, when at least one of the differences exceeds the tolerance (i.e., no perfect match), the authenticity determination unit 50 determines that the memory device 3 connected to the host device 2 is an unauthorized product, and starts a process to eliminate the unauthorized memory device 3. For example, the GPIO 25 is set with a control command to cause the power controller 12 to stop power supply, so as to stop power supply from the power VCC to the memory device 3.

Figure 8:
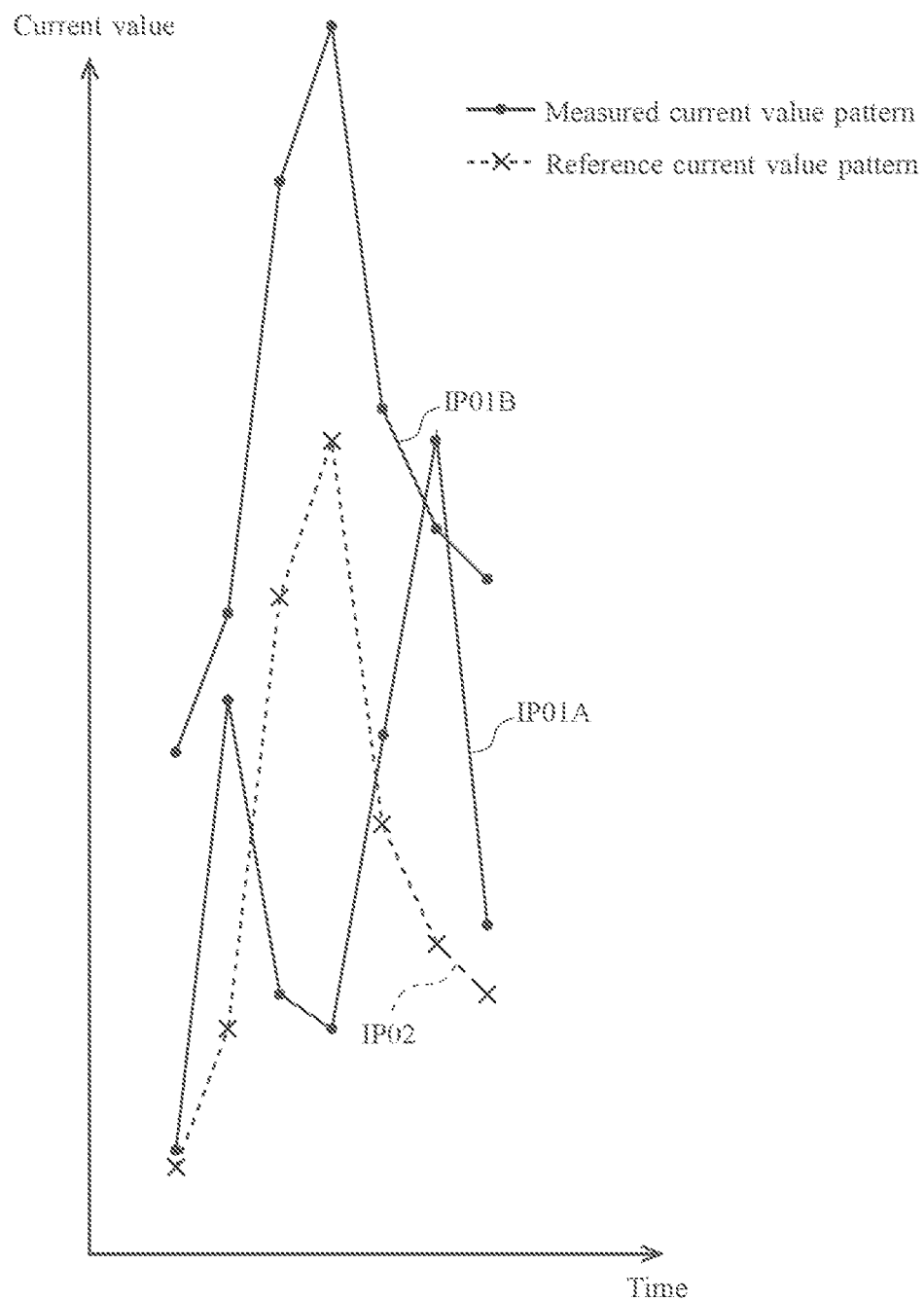
FIG. 8 is a diagram illustrating another example of the measured current value pattern.

FIG. 8 is a diagram illustrating another example of the measured current value pattern. The maximum, the minimum, and the average of the seven measured current values composing the measured current value pattern IP01A match those of the reference current value pattern IP02. However, since the measured current values of the measured current value pattern IP01A do not perfectly match the reference current values of the reference current value pattern IP02, the memory device 3 is determined to be an unauthorized product. The rates of change between the adjacent measured current values in the measured current value pattern IP01B match those in the reference current value pattern IP02. However, since the measured current values of the measured current value pattern IP01B do not perfectly match the reference current values of the reference current value pattern IP02, the memory device 3 is determined to be an unauthorized product.

In the example described above, arithmetic computations to obtain the differences between the measured current values X01 to X07 and the reference current values Y01 to Y07, and arithmetic computations to determine whether the differences between the current values are smaller than or equal to the tolerance are performed by software processing by the CPU 22. Alternatively, these arithmetic computations may be performed by hardware processing by dedicated operating units, to avoid increase in processing load of the CPU 22 due to enormous sampling by the current measurement circuit 13.

Figure 9:
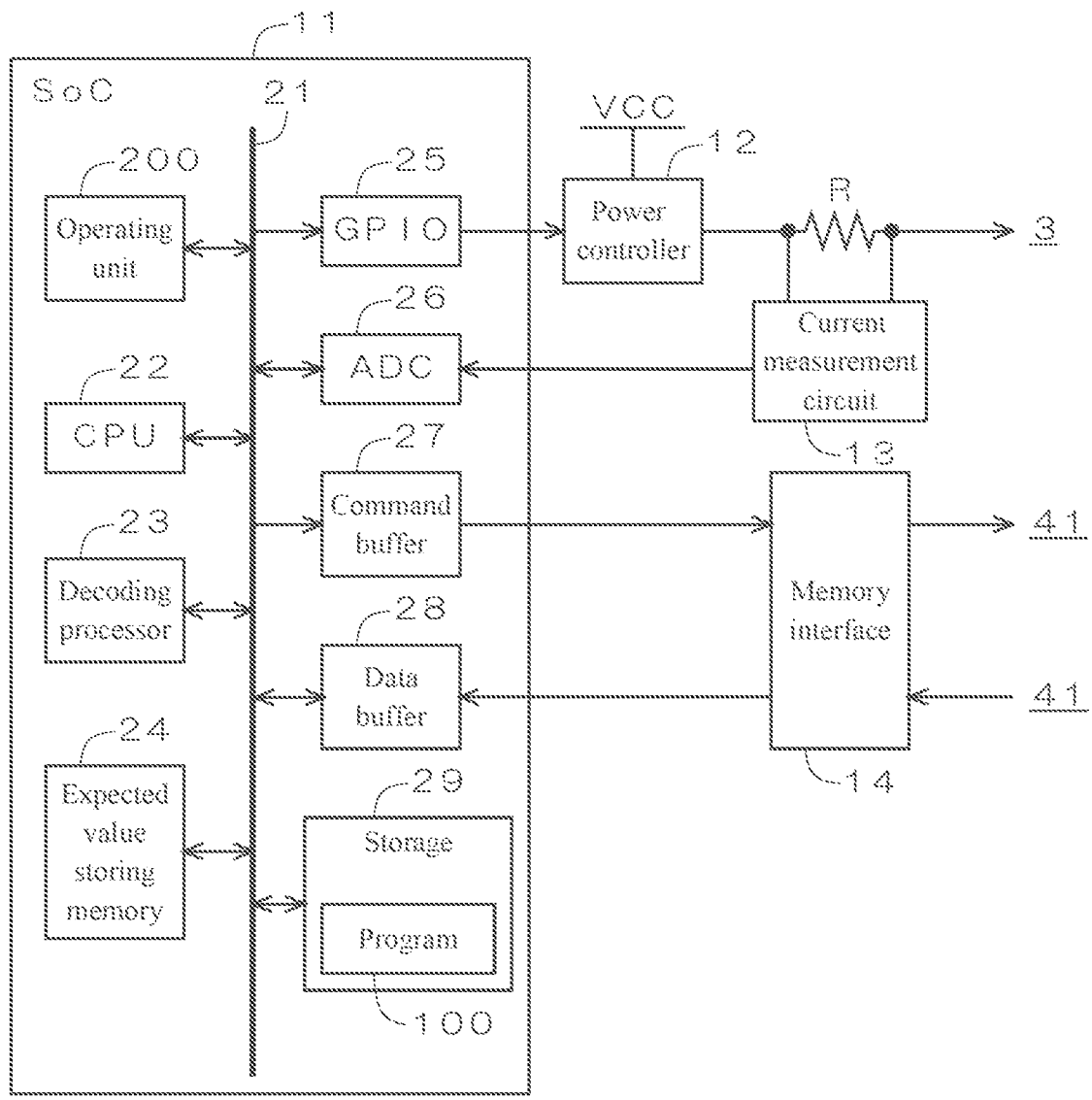
FIG. 9 is a diagram illustrating another configuration of the host device.

FIG. 9 is a diagram illustrating another configuration of the host device 2. The SoC 11 is provided with an operating unit 200. Arithmetic computations to obtain the differences between the measured current values X01 to X07 and the reference current values Y01 to Y07, and arithmetic computations to determine whether the differences between the current values are smaller than or equal to the tolerance are performed by the operating unit 200, and the results of these arithmetic computations are input from the operating unit 200 to the CPU 22.

As described above, in the host device 2 (information processing device) according to the present embodiment, the authenticity determination unit 50 (determination unit) determines whether the memory device 3 (appurtenance device) is an authorized or an unauthorized product, on the basis of a comparison result by the pattern comparing unit 54 between the measured current value pattern IP01 (first measured current value pattern) in the period P1 (first predetermined period) produced by the pattern producing unit 53 and the reference current value pattern IP02 (first reference current value pattern) in the period P1 obtained in advance. Since unauthorized products tend to be inferior, absolute values of current consumption of unauthorized products are often larger than those of authorized products. In the host device 2 according to the present embodiment, the authenticity determination unit 50 compares the measured current value pattern IP01, rather than a pattern of rates of change in current consumption, with the reference current value pattern IP02. This achieves highly accurate authenticity determination of whether the memory device 3 connected to the host device 2 is an authorized or an unauthorized product even when authorized and unauthorized products have a similar pattern of rates of change in current consumption like the measured current value pattern IP01B illustrated in FIG. 8.

In the host device 2 according to the present embodiment, the authenticity determination unit 50 determines whether the memory device 3 is an authorized or an unauthorized product, depending on whether all measured current values X01 to X07 in the period P1 perfectly match the corresponding reference current values Y01 to Y07. Thus for example, when an unauthorized product has the measured current value pattern IP01 that is different in part from that of an authorized product, such unauthorized product is eliminated with high accuracy.

In the host device 2 according to the present embodiment, the reference current value pattern is stored in the memory core 32 of the memory device 3. Different memory devices 3 have different reference current value patterns, depending on the structure, the manufacturing process, and the like of the devices. Thus storing a reference current value pattern obtained for a certain memory device 3 in the memory core 32 of this memory device 3 facilitates management of the reference current value pattern that differs from device to device.

Description is given below of various modifications to the above embodiment.

Modifications described below may be applicable in arbitrary combination.

Modification 1

In the above embodiment, the authenticity determination unit 50 determines that the memory device 3 is an authorized product, when all measured current values X01 to X07 in the period P1 perfectly match the corresponding reference current values Y01 to Y07.

In the present modification, the authenticity determination unit 50 determines that the memory device 3 is an authorized product, when the proportion of the measured current values X01 to X07 that match the corresponding reference current values Y01 to Y07 of all measured current values X01 to X07 in the period P1 is larger than or equal to a first threshold, while it determines that the memory device 3 is an unauthorized product, when the proportion is smaller than the first threshold. The first threshold is additionally set in Step SP101, to an optimal value depending on, for example, required determination accuracy, the value being at least 51% or larger.

In the host device 2 according to the present modification, the authenticity determination unit 50 determines whether the memory device 3 is an authorized or an unauthorized product, depending on whether the proportion of the measured current values X01 to X07 that match the corresponding reference current values Y01 to Y07 of all measured current values X01 to X07 in the period P1 is larger than or equal to the first threshold. This effectively prevents an authorized product from being erroneously determined to be an unauthorized product, even when, for example, the measured current values X01 to X07 of the authorized product instantaneously increase or decrease due to unexpected noise or the like.

Modification 2

In the above embodiment, the pattern producing unit 53 produces the measured current value pattern only once, the pattern comparing unit 54 compares the measured current value pattern with the reference current value pattern only once, and the authenticity determination unit 50 performs authenticity determination of the memory device 3 on the basis of only one comparison result by the pattern comparing unit 54.

In the present modification, the authenticity determination unit 50 performs authenticity determination of the memory device 3 on the basis of multiple comparison results by the pattern comparing unit 54.

Figure 10:
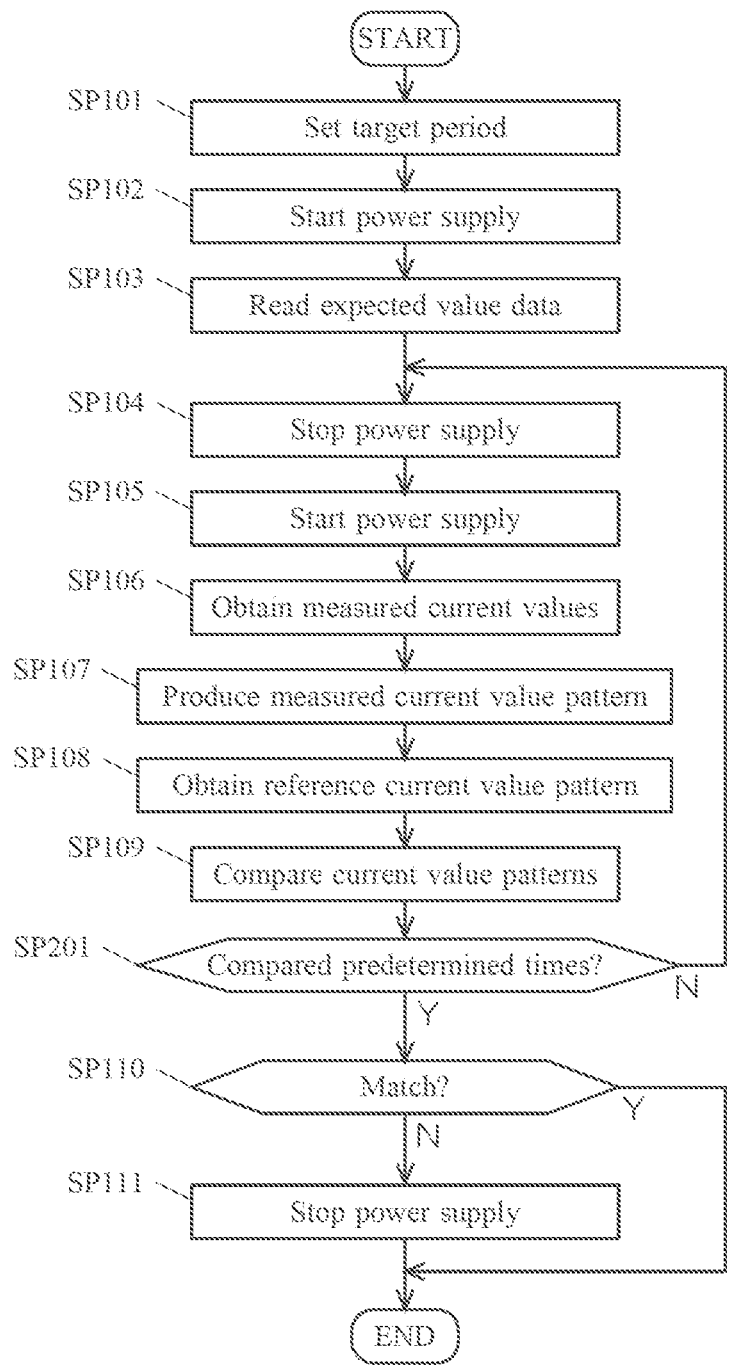
FIG. 10 is a flow chart for illustrating the operation of the host device.

FIG. 10 is a flow chart for illustrating the operation of the host device 2. Following Step SP109, in Step SP201, the authenticity determination unit 50 determines whether the pattern comparing unit 54 has performed comparison between the measured current value pattern and the reference current value pattern for a predetermined N times, where N is a plural number.

When the comparison has not been performed for N times, the CPU 22 repeats Steps SP104 to SP109. When the comparison has been performed for N times, the CPU 22 proceeds to Step SP110.

In Step SP110, the authenticity determination unit 50 determines that the memory device 3 is an authorized product, when the proportion of results that the measured current value pattern matches the reference current value pattern of N-time comparison by the pattern comparing unit 54 is larger than or equal to a second threshold, while it determines that the memory device 3 is an unauthorized product when the proportion is smaller than the second threshold. The predetermined N times is additionally set in Step SP101 to an optimal value depending on, for example, required determination accuracy. The second threshold is also additionally set in Step SP101, to an optimal value depending on, for example, required determination accuracy, the value being at least 51% or larger.

In the host device 2 according to the present modification, the authenticity determination unit 50 performs obtainment of measured current values by the current value obtaining unit 52, production of a measured current value pattern by the pattern producing unit 53, and comparison between the measured current value pattern and a reference current value pattern by the pattern comparing unit 54 for multiple N times, and determines whether the memory device 3 is an authorized or an unauthorized product, depending on whether the proportion of results that the measured current value pattern matches the reference current value pattern of N-time comparison by the pattern comparing unit 54 is larger than or equal to the second threshold. Repeating a series of processes by the current value obtaining unit 52, the pattern producing unit 53, and the pattern comparing unit 54 for multiple N times, and performing authenticity determination of the memory device 3 on the basis of the results of N-time comparison by the pattern comparing unit 54 improves determination accuracy.

Modification 3

In the above embodiment, the period setting unit 51 sets only one period P1 as a target period among the multiple periods P1 to P8 obtained by dividing the operational period of the memory device 3.

In the present modification, the period setting unit 51 sets multiple periods as target periods among the periods P1 to P8.

Figure 11:
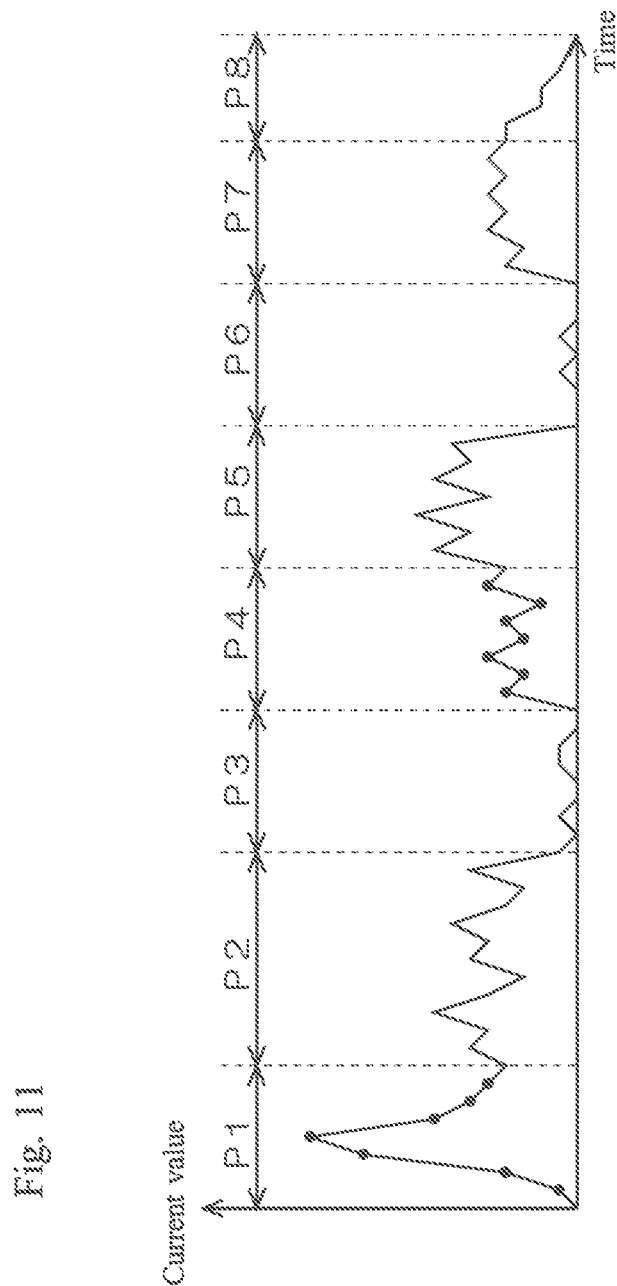
FIG. 11 is a diagram illustrating an example of the current consumption characteristics of the memory device.

FIG. 11 is a diagram illustrating an example of the current consumption characteristics of the memory device 3. In this example, the period setting unit 51 sets the period P1, which is the power-on period (first predetermined period), and the period P4, which is the key-exchange period (second predetermined period), as target periods in Step SP101.

In Step SP101, the period setting unit 51 also sets a process of authenticity determination to be performed in the periods P1 and P4. In the example according to the present modification, "comparison between current value patterns" is set as the process of authenticity determination in both periods.

In Step SP103, the reference current value patterns in the periods P1 and P4 and data on corresponding predetermined tolerances are read as the desired expected value data 300 from the memory core 32. These information are sent from the memory device 3 to the host device 2, decoded by the decoding processor 23, and then stored in the expected value storing memory 24.

The current value obtaining unit 52 obtains measured current values in the periods P1 and P4, the pattern producing unit 53 produces measured current value patterns in the periods P1 and P4, and the pattern comparing unit 54 compares the measured current value patterns with the reference current value patterns in the periods P1 and P4.

The authenticity determination unit 50 determines whether the memory device 3 is an authorized or an unauthorized product, on the basis of a comparison result in the period P1 by the pattern comparing unit 54 and a comparison result in the period P4 by the pattern comparing unit 54. For example, when the measured current value pattern matches the reference current value pattern in both of the periods P1 and P4, the memory device 3 is determined to be an authorized product, while when the measured current value pattern does not match the reference current value pattern in at least one of the periods P1 and P4, the memory device 3 is determined to be an unauthorized product.

In the host device 2 according to the present modification, the authenticity determination unit 50 determines whether the memory device 3 is an authorized or an unauthorized product, further on the basis of a comparison result by the pattern comparing unit 54 between the measured current value pattern (second measured current value pattern) in the period P4 (second predetermined period) produced by the pattern producing unit 53 and the reference current value pattern (second reference current value pattern) in the period P4 obtained in advance. By comparing the measured current value pattern with the reference current value pattern in the period P4 as well as in the period P1, authenticity determination of the memory device 3 is performed on the basis of the comparison results in both of the periods P1 and P4, which further improves determination accuracy.

Modification 4

In the above embodiment, the authenticity determination unit 50 performs authenticity determination of the memory device 3 on the basis of a comparison result only between the measured current value pattern and the reference current value pattern in the period P1.

In the present modification, the authenticity determination unit 50 performs authenticity determination of the memory device 3 on the basis of a comparison result between a measured representative value and a reference representative value, in addition to a comparison result, between the measured current value pattern and the reference current value pattern, in the period P1. As described in the above embodiment, the maximum, the minimum, and the average values of current consumption (reference representative value) in each of the periods P1 to P8 are stored as a part of the expected value data 300 in the memory core 32.

Figure 12:
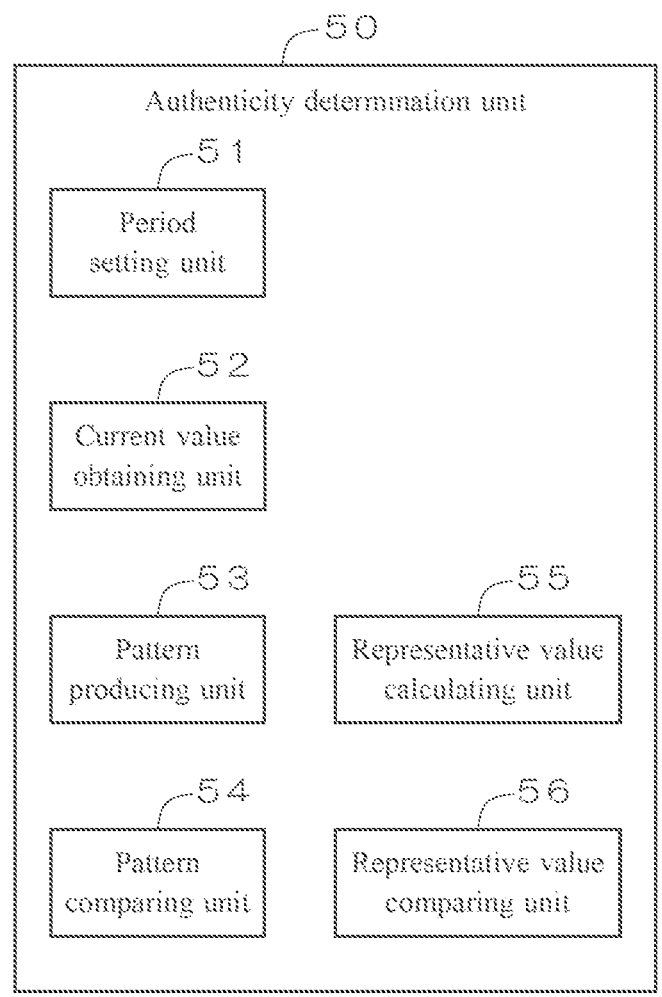
FIG. 12 is a diagram illustrating functions performed by executing a program by a CPU.

FIG. 12 is a diagram illustrating functions performed by executing the program 100 illustrated in FIG. 2 by the CPU 22. As illustrated in FIG. 12, the authenticity determination unit 50 serves as the period setting unit 51, the current value obtaining unit 52, the pattern producing unit 53, the pattern comparing unit 54, the representative value calculating unit 55, and the representative value comparing unit 56.

Figure 13:
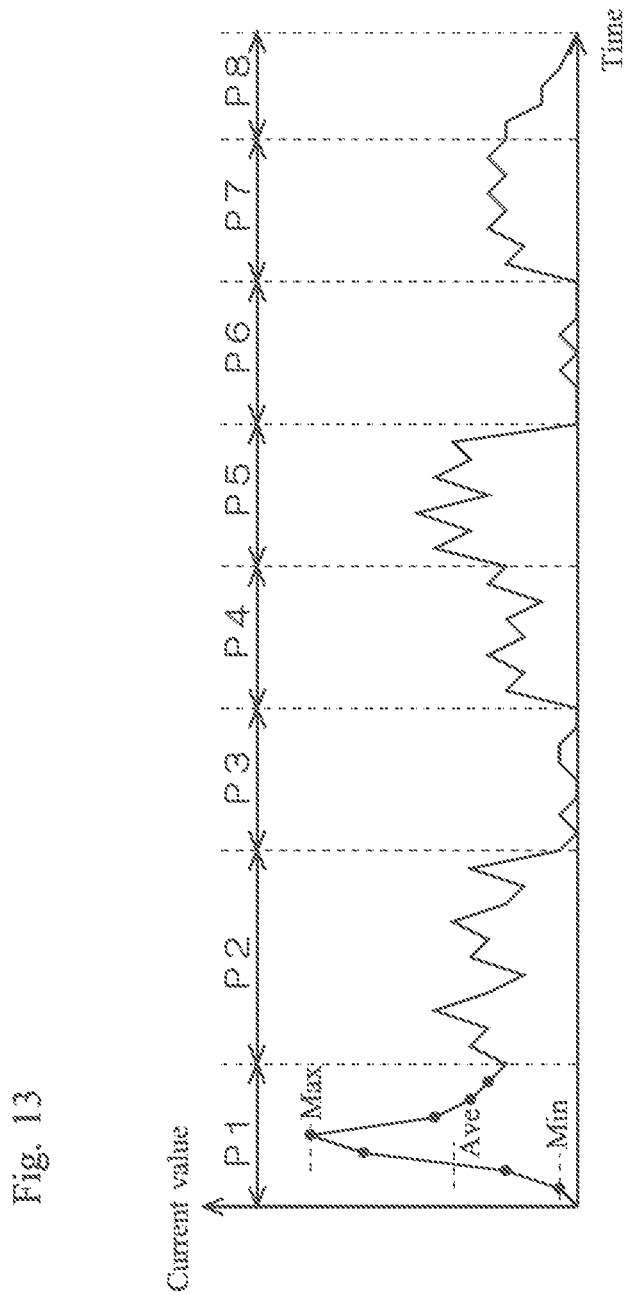
FIG. 13 is a diagram illustrating an example of the current consumption characteristics of the memory device.

FIG. 13 is a diagram illustrating an example of the current consumption characteristics of the memory device 3. In this example, in Step SP101, the period setting unit 51 sets the period P1, which is the power-on period, as a target period. In Step SP101, the period setting unit 51 also sets "comparison between current value patterns" and "comparison between maximum values, between minimum values, and between average values" as the process of authenticity determination to be performed in the period P1.

Figure 14:
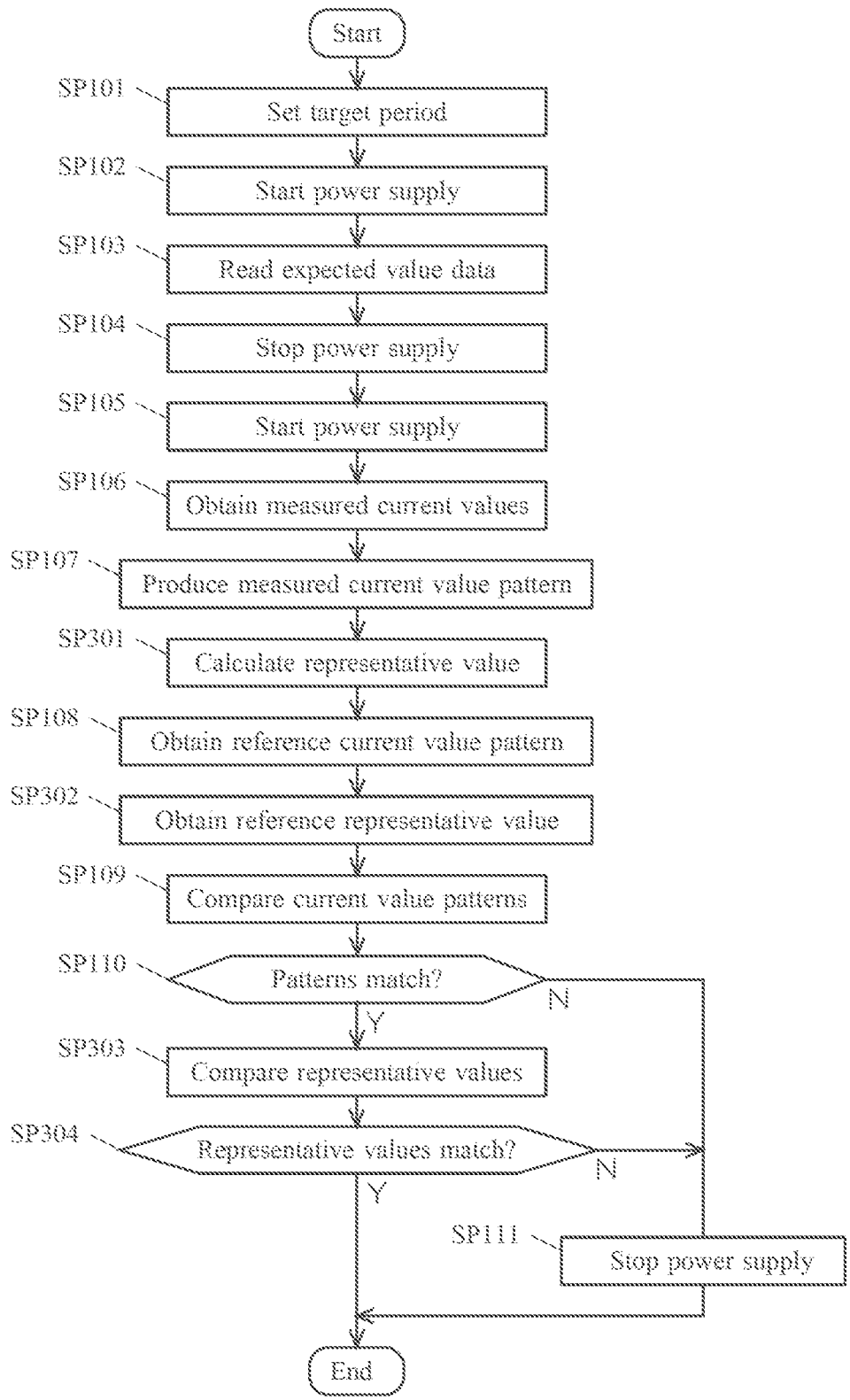
FIG. 14 is a flow chart for illustrating the operation of the host device.

FIG. 14 is a flow chart for illustrating the operation of the host device 2. In Step SP103, the reference current value pattern in the period P1, the reference representative values (reference maximum, minimum, and average values) in the period P1 and data on corresponding predetermined tolerances are read as the desired expected value data 300 from the memory core 32. These information are sent from the memory device 3 to the host device 2, decoded by the decoding processor 23, and then stored in the expected value storing memory 24.

In the period P1, the current value obtaining unit 52 obtains measured current values, the pattern producing unit 53 produces a measured current value pattern, and the pattern comparing unit 54 compares the measured current value pattern with the reference current value pattern.

In Step SP301, the representative value calculating unit 55 calculates measured maximum, minimum, and average values in the period P1, on the basis of the measured current values X01 to X07 obtained by the current value obtaining unit 52.

In Step SP302, the representative value comparing unit 56 obtains the reference representative values from the expected value storing memory 24.

In Step SP303, the representative value comparing unit 56 determines whether a difference between the measured maximum value and the reference maximum value is smaller than or equal to the tolerance, whether a difference between the measured minimum value and the reference minimum value is smaller than or equal to the tolerance, and whether a difference between the measured average value and the reference average value is smaller than or equal to the tolerance.

When the measured current value pattern matches the reference current value pattern, and the differences of the above three representative values are all smaller than or equal to the tolerances, the authenticity determination unit 50 determines that the memory device 3 is an authorized product.

Arithmetic computations to obtain the measured representative values, arithmetic computations to obtain the differences between the measured representative values and the reference representative values, and arithmetic computations to determine whether the differences between the measured representative value and the reference representative values are smaller than or equal to the tolerances may be performed by the operating unit 200 illustrated in FIG. 9. Instead of employing all three measured representative values (maximum, minimum, and average values), only one or two of the measured representative values may be employed.

In the host device 2 according to the present modification, the authenticity determination unit 50 determines whether the memory device 3 is an authorized or an unauthorized product, on the basis of comparison results in the period P1 between the measured representative values and the reference representative values by the representative value comparing unit 56 in addition to that between the measured current value pattern and the reference current value pattern by the pattern comparing unit 54. By comparing the measured representative values with the reference representative values as well as comparing the measured current value pattern with the reference current value pattern, authenticity determination of the memory device 3 is performed on the basis of both of the comparison results, which further improves determination accuracy.

In the host device 2 according to the present modification, the representative value calculating unit 55 calculates at least one of the average, the maximum, and the minimum values as the measured representative value. Employing at least one of the average, the maximum, and the minimum values as the measured representative value facilitates calculation of the measured representative value.

In the host device 2 according to the present modification, the reference representative value is stored in the memory core 32 of the memory device 3. Different memory devices 3 have different reference representative values, depending on the structure, the manufacturing process, and the like of the devices. Thus storing a reference representative value for a certain memory device 3 in the memory core 32 of this memory device 3 facilitates management of the reference representative value that differs from device to device.

Modification 5

In the above Modification 4, the period setting unit 51 sets only one period P1 as a target period among the multiple periods P1 to P8.

In the present modification, the period setting unit 51 sets multiple periods as a target period among the periods P1 to P8.

Figure 15:
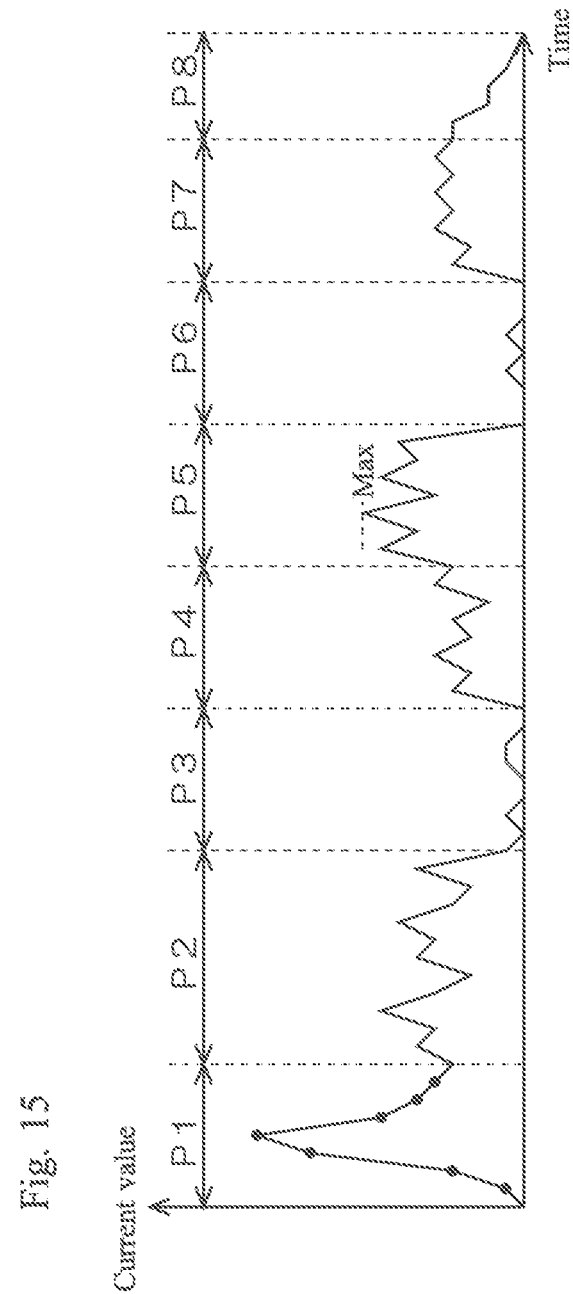
FIG. 15 is a diagram illustrating an example of the current consumption characteristics of the memory device.

FIG. 15 is a diagram illustrating an example of the current consumption characteristics of the memory device 3. In this example, the period setting unit 51 sets the period P1, which is the power-on period, and the period P5, which is the authentication period, as target periods in Step SP101.

In Step SP101, the period setting unit 51 also sets processes of authenticity determination to be performed in the periods P1 and P5. In the example according to the present modification, "comparison between current value patterns" is set as the process of authenticity determination in the period P1, while "comparison between maximum values" is set as the process of authenticity determination in the period P5.

In Step SP103, the reference current value pattern in the period P1, the reference maximum value in the period P5, and data on corresponding predetermined tolerances are read as the desired expected value data 300 from the memory core 32. These information are sent from the memory device 3 to the host device 2, decoded by the decoding processor 23, and then stored in the expected value storing memory 24.

The current value obtaining unit 52 obtains measured current values in the period P1, the pattern producing unit 53 produces a measured current value pattern in the period P1, and the pattern comparing unit 54 compares the measured current value pattern with the reference current value pattern in the period P1.

Moreover, the current value obtaining unit 52 obtains measured current values in the period P5, the representative value calculating unit 55 calculates the measured maximum value in the period P5, and the representative value comparing unit 56 compares the measured maximum value with the reference maximum value in the period P5.

The authenticity determination unit 50 determines whether the memory device 3 is an authorized or an unauthorized product, on the basis of a comparison result in the period P1 by the pattern comparing unit 54 and a comparison result in the period P5 by the representative value comparing unit 56. For example, when the measured current value pattern matches the reference current value pattern in the period P1 and the measured maximum value matches the reference maximum value in the period P5, the memory device 3 is determined to be an authorized product.

In the host device 2 according to the present modification, the authenticity determination unit 50 determines whether the memory device 3 is an authorized or an unauthorized product, on the basis of a comparison result between current value patterns in the period P1 by the pattern comparing unit 54 and a comparison result between the representative values in the period P5 by the representative value comparing unit 56. By comparing the measured representative value with the reference representative value in the period P5, as well as comparing the measured current value pattern with the reference current value pattern in the period P1, authenticity determination of the memory device 3 is performed on the basis of both of the comparison results, which further improves determination accuracy. Moreover, employing different processes of authenticity determination between the period P1 and the period P5 effectively makes analysis of determination algorithms by a third party more difficult.

Modification 6

Figure 16:
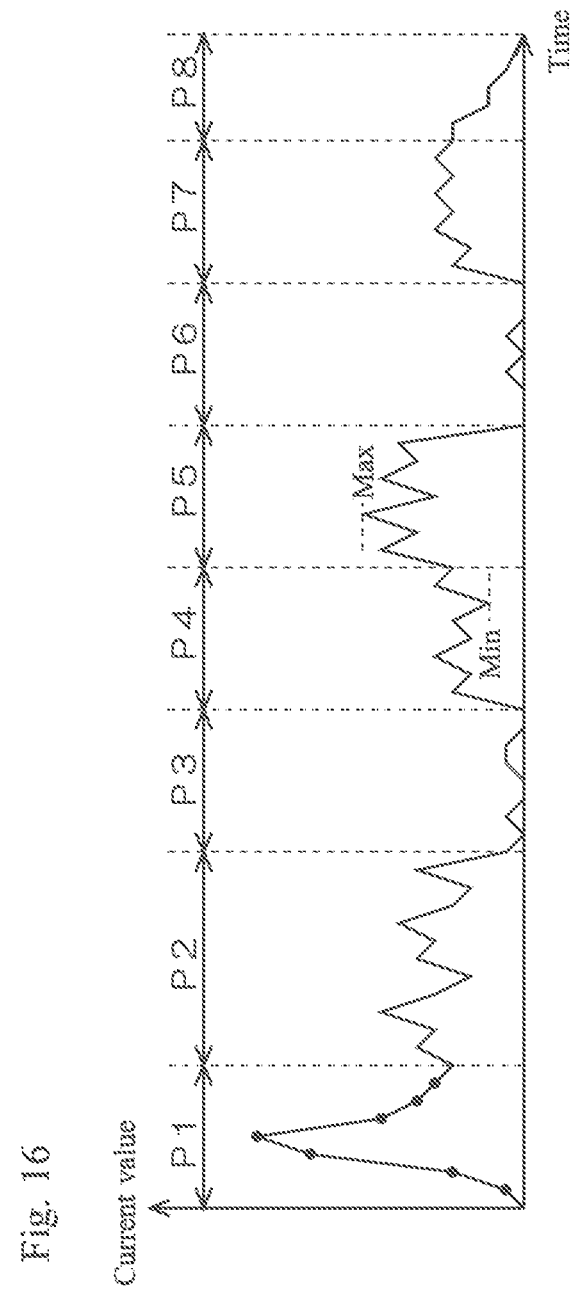
FIG. 16 is a diagram illustrating an example of the current consumption characteristics of the memory device.

FIG. 16 is a diagram illustrating an example of the current consumption characteristics of the memory device 3. In this example, the period setting unit 51 sets the period P1, which is the power-on period (first predetermined period), and the period P4 and the period P5 successively following the period P4, which are key-exchange periods (second predetermined period), as a target periods in Step SP101.

In Step SP101, the period setting unit 51 also sets processes of authenticity determination in the periods P1, P4, and P5. In the example according to the present modification, "comparison between current value patterns" is set as the process of authenticity determination in the period P1, and "comparison between representative values" is set as the process of authenticity determination in periods P4 and P5. When there are two successive second predetermined periods like the periods P4 and P5, the period setting unit 51 employs a different representative value for one of the second predetermined periods from that for the other. In the present modification, "comparison between minimum values" is set as the process of authenticity determination in the period P4, while "comparison between maximum values" is set as the process of authenticity determination in the period P5.

In Step SP103, the reference current value pattern in the period P1, the reference minimum value in the period P4, the reference maximum value in the period P5 and data on corresponding predetermined tolerances are read as the desired expected value data 300 from the memory core 32. These information are sent from the memory device 3 to the host device 2, decoded by the decoding processor 23, and then stored in the expected value storing memory 24.

The current value obtaining unit 52 obtains measured current values in the period P1, the pattern producing unit 53 produces a measured current value pattern in the period P1, and the pattern comparing unit 54 compares the measured current value pattern with the reference current value pattern in the period P1.

Moreover, the current value obtaining unit 52 obtains measured current values in the period P4, the representative value calculating unit 55 calculates the measured minimum value in the period P4, and the representative value comparing unit 56 compares the measured minimum value with the reference minimum value in the period P4.

Furthermore, the current value obtaining unit 52 obtains measured current value in the period P5, the representative value calculating unit 55 calculates the measured maximum value in the period P5, and the representative value comparing unit 56 compares the measured maximum value with the reference maximum value in the period P5.

The authenticity determination unit 50 determines whether the memory device 3 is an authorized or an unauthorized product, on the basis of a comparison result in the period P1 by the pattern comparing unit 54 and comparison results in the periods P4 and P5 by the representative value comparing unit 56. For example, when the measured current value pattern matches the reference current value pattern in the period P1,the measured minimum value matches the reference minimum value in the period P4, and the measured maximum value matches the reference maximum value in the period P5, the memory device 3 is determined to be an authorized product.

In the host device 2 according to the present modification, the representative value calculating unit 55 calculates a first value (minimum) among the average, the maximum, and the minimum values in one period (P4) of the two successive second predetermined periods (P4 and P5), while it calculates a second value (maximum) different from the first value in the other (P5). Employing different processes of authenticity determination in two successive second predetermined periods effectively makes analysis of determination algorithms by a third party more difficult.

Modification 7

In the above embodiment, the authenticity determination unit 50 performs authenticity determination of the memory device 3 on the basis of only a comparison result between the measured current value pattern and the reference current value pattern in the period P1.

In the present modification, the authenticity determination unit 50 performs authenticity determination of the memory device 3 on the basis of a comparison result between the measured current values and the reference current values in the standby period, in addition to a comparison result between the measured current value pattern and the reference current value pattern in the period P1. As described in the above embodiment, the value of minute current consumption (reference current value) in the standby period is stored as a part of the expected value data 300 in the memory core 32. In the example according to the present modification, there are two standby periods P3 and P6. The period setting unit 51 can arbitrarily set one (or both) of the periods P3 and P6 as a target period, or may switch these periods statically or dynamically.

Figure 17:
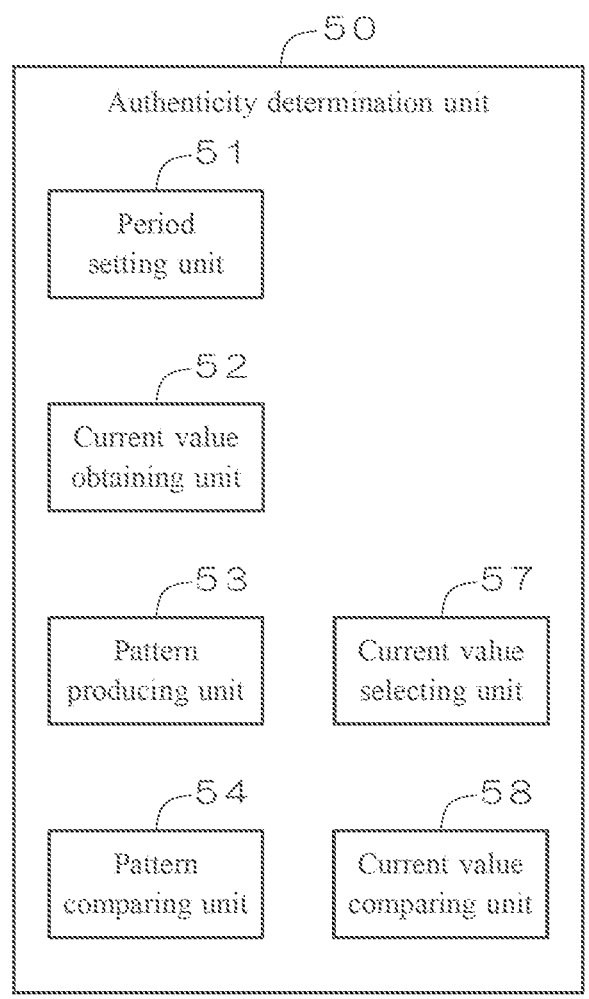
FIG. 17 is a diagram illustrating functions performed by executing the program by the CPU.

FIG. 17 a diagram illustrating functions performed by executing the program 100 illustrated in FIG. 2 by the CPU 22. As illustrated in FIG. 17, the authenticity determination unit 50 serves as the period setting unit 51, the current value obtaining unit 52, the pattern producing unit 53, the pattern comparing unit 54, the current value selecting unit 57, and the current value comparing unit 58.

Figure 18:
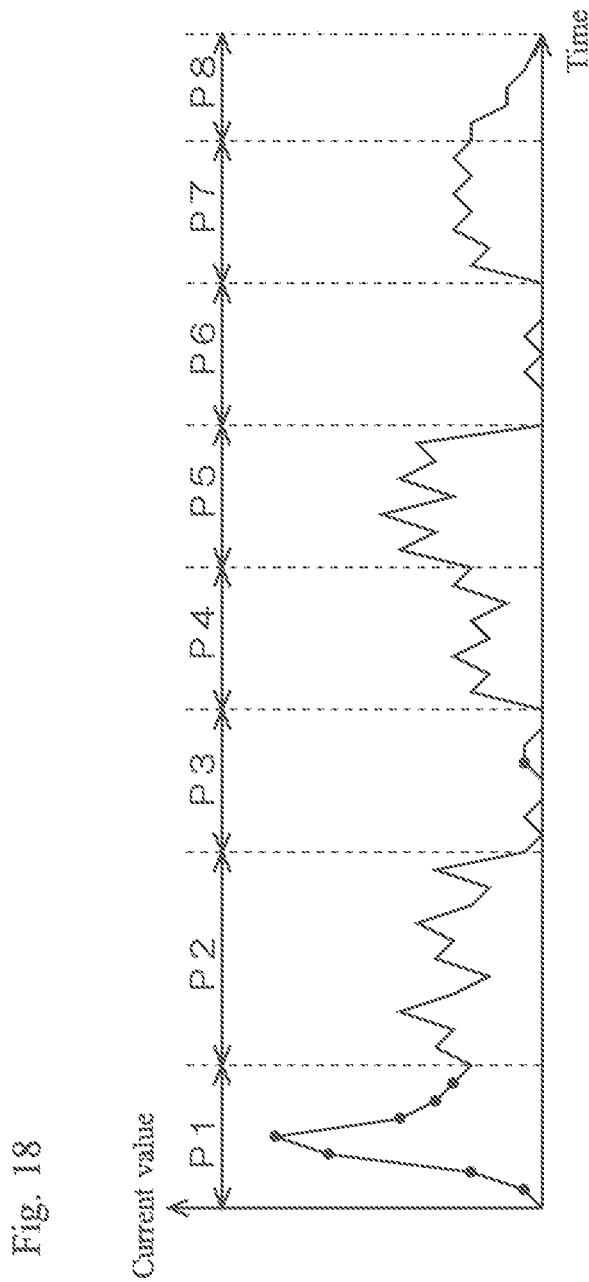
FIG. 18 is a diagram illustrating an example of the current consumption characteristics of the memory device.

FIG. 18 is a diagram illustrating an example of the current consumption characteristics of the memory device 3. In this example, in Step SP101, the period setting unit 51 sets the period P1, which is the power-on period, and the period P3, which is the standby period, as a target period. In Step SP101, the period setting unit 51 also sets "comparison between current value patterns" as the process of authenticity determination to be performed in the period P1, and "comparison between current values" as the process of authenticity determination to be performed in the period P3.

Figure 19:
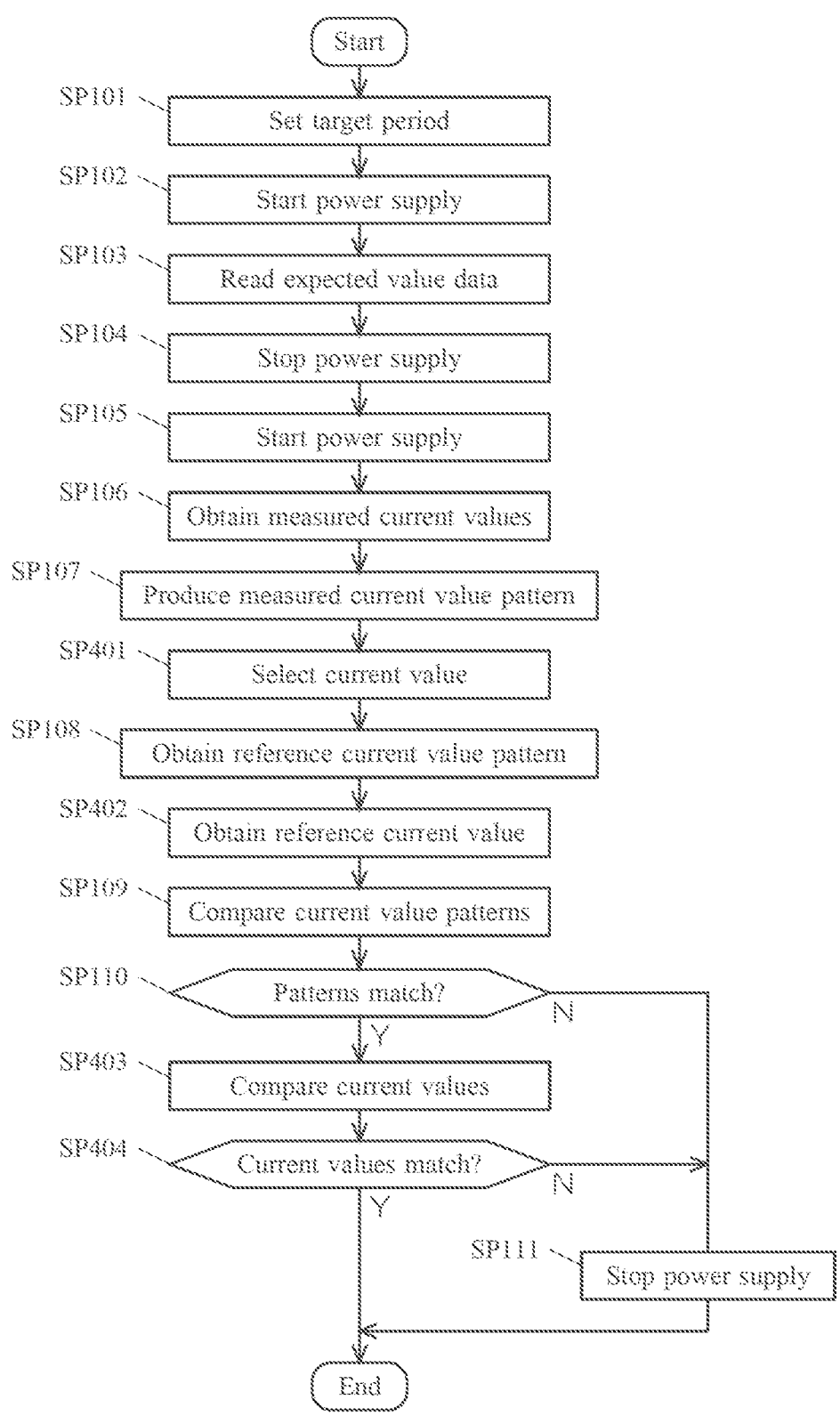
FIG. 19 is a flow chart for illustrating the operation of the host device.

FIG. 19 is a flow chart for illustrating the operation of the host device 2. In Step SP103, the reference current value pattern in the period P1, the reference current value in the period P3, and data on a corresponding predetermined tolerances are read as the desired expected value data 300 from the memory core 32. These information are sent from the memory device 3 to the host device 2, decoded by the decoding processor 23, and then stored in the expected value storing memory 24.

In the period P1, the current value obtaining unit 52 obtains measured current values, the pattern producing unit 53 produces a measured current value pattern, and the pattern comparing unit 54 compares the measured current value pattern with the reference current value pattern.

In Step SP401, the current value selecting unit 57 selects an arbitrary measured current value from multiple measured current values in the period P3 obtained by the current value obtaining unit 52. In the standby period, since the absolute values of current consumption are small, selecting any of the measured current values makes not much difference.

In Step SP402, the current value comparing unit 58 obtains the reference current value from the expected value storing memory 24.

In Step SP403, the current value comparing unit 58 determines whether a difference between the measured current value selected in Step SP401 and the reference current value obtained in the Step SP402 is smaller than or equal to the tolerance.

When the measured current value pattern matches the reference current value pattern in the period P1, and the difference between the measured current value and the reference current value in the period P3 is smaller than or equal to the tolerance, the authenticity determination unit 50 determines that the memory device 3 is an authorized product.

In the host device 2 according to the present modification, the authenticity determination unit 50 determines whether the memory device 3 is an authorized or an unauthorized product, on the basis of a comparison result between the measured current value and the reference current value in the period P3 (third predetermined period) by the current value comparing unit 58 in addition to a comparison result between the measured current value pattern and the reference current value pattern in the period P1 (first predetermined period) by the pattern comparing unit 54. By comparing the measured current value with the reference current value in the period P3, as well as comparing the measured current value pattern with the reference current value pattern in the period P1, authenticity determination of the memory device 3 is performed on the basis of both of the comparison results, which further improves determination accuracy. Moreover, employing different determination between the period P1 and the period P3 effectively makes analysis of determination algorithms by a third party more difficult.

In the host device 2 according to the present modification, the period setting unit 51 variably sets a target period from multiple standby periods P3 and P6. Altering the target periods P3 and P6 for authenticity determination of the memory device 3 statically or dynamically by the period setting unit 51 effectively makes analysis of determination algorithms by a third party more difficult.

In the host device 2 according to the present modification, the reference current value is stored in the memory core 32 of the memory device 3. Different memory devices 3 have different reference current values, depending on the structure, the manufacturing process, and the like of the devices. Thus storing a reference current value obtained for a certain memory device 3 in the memory core 32 of this memory device 3 facilitates management of the reference current value that differs from device to device.

Modification 8

FIG. 20 is a diagram illustrating an example of the current consumption characteristics of the memory device 3. In the example illustrated in FIG. 20, authenticity determination is set to "comparison between current value patterns" in the periods P1 and P2, "comparison between current values" in the periods P3 and P6, "comparison between minimum values" in the period P4, "comparison between maximum values" in the period P5, and "comparison between average values" in the period P7. In short, a total of seven processes of authenticity determination are set in the periods P1 to P7.

For a first example, the authenticity determination unit 50 determines that the memory device 3 is an authorized product, when all seven authenticity determination processes exhibit "a match," while it determines that the memory device 3 is an unauthorized product, when at least one of the seven authenticity determination processes exhibits "no match."

For a second example, the authenticity determination unit 50 determines that the memory device 3 is an authorized product, when the proportion of authenticity determination processes that exhibit "a match" of the seven authenticity determination processes is larger than or equal to a third threshold, while it determines that the memory device 3 is an unauthorized product, when the proportion is smaller than the third threshold. The third threshold is set to an optimal value depending on, for example, a required determination scheme, the value being at least 51% or larger.

While the invention has been described in detail, the foregoing description is in all aspects illustrative and not restrictive. It is understood that numerous other modifications and variations can be devised without departing from the scope of the invention.

What is claimed is:

1. An information processing device to which an appurtenance device is to be connected, the information processing device comprising circuitry configured to:
    supply power to the appurtenance device;
    obtain a plurality of measured current values from the information processing device to the appurtenance device measured at a plurality of measurement points;
    chronologically arrange the obtained measured current values to produce a measured current value pattern;
    compare the produced measured current value pattern with a reference current value pattern of an authorized or an unauthorized product that is obtained in advance; and
    determine whether the appurtenance device is an authorized or an unauthorized product, based on a comparison result between a first measured current value pattern produced for a first predetermined period among a plurality of predetermined periods obtained by dividing an operational period of the appurtenance device and a first reference current value pattern obtained in advance for the first predetermined period.

2. The information processing device according to claim 1, wherein the circuitry is configured to
    compare measured current values composing the measured current value pattern with reference current values composing the reference current value pattern respectively, and
    determine whether the appurtenance device is an authorized or an unauthorized product, depending on whether all measured current values in the first predetermined period match corresponding reference current values.

3. The information processing device according to claim 1, wherein the circuitry is configured to
    compare measured current values composing the measured current value pattern with reference current values composing the reference current value pattern respectively, and
    determine whether the appurtenance device is an authorized or an unauthorized product, depending on whether a proportion of measured current values that match corresponding reference current values of all measured current values in the first predetermined period is larger than or equal to a first threshold.

4. The information processing device according to claim 1, wherein the circuitry is configured to
    perform obtainment of the measured current values, production of the measured current value pattern, and comparison between the measured current value pattern and the reference current value pattern for N times where N is a plural number, and
    determine whether the appurtenance device is an authorized or an unauthorized product, depending on whether a proportion of results that the measured current value pattern matches the reference current value pattern of N-time comparison is larger than or equal to a second threshold.

5. The information processing device according to claim 1, wherein the circuitry is configured to
    determine whether the appurtenance device is an authorized or an unauthorized product, further based on a comparison result between a second measured current value pattern produced for a second predetermined period among the plurality of predetermined periods and a second reference current value pattern obtained in advance for the second predetermined period.

6. The information processing device according to claim 1, wherein the circuitry is further configured to
    calculate a predetermined measured representative value based on the obtained measured current values,
    compare the calculated measured representative value with a reference representative value of an authorized or an unauthorized product that is obtained in advance, and
    determine whether the appurtenance device is an authorized or an unauthorized product, further based on a comparison result between a first measured representative value calculated for the first predetermined period and a first reference representative value obtained in advance for the first predetermined period.

7. The information processing device according to claim 1, wherein the circuitry is further configured to
    calculate a predetermined measured representative value based on the obtained measured current values,
    compare the calculated measured representative value with a reference representative value of an authorized or an unauthorized product that is obtained in advance, and
    determine whether the appurtenance device is an authorized or an unauthorized product, further based on a comparison result between a second measured representative value calculated for a second predetermined period among the plurality of predetermined periods and a second reference representative value obtained in advance for the second predetermined period.

8. The information processing device according to claim 6, wherein the circuitry is configured to
    calculate at least one of an average, a maximum, and a minimum values as the measured representative value.

9. The information processing device according to claim 7, wherein the circuitry is configured to
    calculate a first value selected from the average, the maximum, and the minimum values for one of two successive second predetermined periods, and calculate a second value different from the first value for the other second predetermined period.

10. The information processing device according to claim 1, wherein the circuitry is further configured to
    select an arbitrary measured current value from the obtained measured current values,
    compare the selected measured current value with a reference current value of an authorized or an unauthorized product that is obtained in advance, and
    determine whether the appurtenance device is an authorized or an unauthorized product, further based on a comparison result between the measured current value selected for a third predetermined period among the plurality of predetermined periods and a reference current value obtained in advance for the third predetermined period.

11. The information processing device according to claim 1, wherein the circuitry is further configured to
variably select the first predetermined period from the plurality of predetermined periods.

12. The information processing device according to claim 5, wherein the circuitry is further configured to
variably select the second predetermined period from the plurality of predetermined periods.

13. The information processing device according to claim 10, wherein the circuitry is further configured to
variably select the third predetermined period from the plurality of predetermined periods.

14. The information processing device according to claim 1,
the reference current value pattern being stored in a storage of the appurtenance device,
wherein the circuitry is configured to read the reference current value pattern from the storage.

15. The information processing device according to claim 6,
the reference representative value being stored in a storage of the appurtenance device,
wherein the circuitry is configured to read the reference representative value from the storage.

16. The information processing device according to claim 10,
the reference current value being stored in a storage of the appurtenance device,
wherein the circuitry is configured to read the reference current value from the storage.

17. A non-transitory computer-readable recording medium having recorded thereon
a program configured to cause an on-board computer of an information processing device to which an appurtenance device is to be connected, the information processing device including circuitry to supply power to the appurtenance device and measure a current from the information processing device to the appurtenance device, to perform determination of whether the appurtenance device is an authorized or an unauthorized product,
the determination comprising:
obtaining a plurality of measured current values measured at a plurality of measurement points;
chronologically arranging the obtained measured current values to produce a measured current value pattern;
comparing the produced measured current value pattern with a reference current value pattern of an authorized or an unauthorized product that is obtained in advance; and
determining whether the appurtenance device is an authorized or an unauthorized product, based on a comparison result between a first measured current value pattern produced for a first predetermined period among a plurality of predetermined periods obtained by dividing an operational period of the appurtenance device and a first reference current value pattern obtained in advance for the first predetermined period.

18. A method for determining authenticity of an appurtenance device to be connected to an information processing device, comprising:
supplying power to the appurtenance device;
obtaining a plurality of measured current values from the information processing device to the appurtenance device measured at a plurality of measurement points;
producing a measured current value pattern by chronologically arranging the obtained measured current values;
comparing the produced measured current value pattern with a reference current value pattern of an authorized or an unauthorized product that is obtained in advance; and
determining whether the appurtenance device is an authorized or an unauthorized product, based on a comparison result between a first measured current value pattern produced for a first predetermined period among a plurality of predetermined periods obtained by dividing an operational period of the appurtenance device and a first reference current value pattern obtained in advance for the first predetermined period.

* * * * *